United States Patent
Yavuz et al.

(10) Patent No.: US 12,491,506 B2
(45) Date of Patent: Dec. 9, 2025

(54) CATALYSTS FOR DRY REFORMING AND METHODS OF PRODUCING THE SAME

(71) Applicants: Saudi Arabian Oil Company, Dhahran (SA); King Abdullah University of Science and Technology, Thuwal (SA)

(72) Inventors: Cafer Tayyar Yavuz, Thuwal (SA); Seokjin Kim, Jinju (KR); Aadesh Harale, Dhahran (SA); Bandar Al Solami, Dhahran (SA); Aqil Jamal, Dhahran (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 758 days.

(21) Appl. No.: 17/885,197

(22) Filed: Aug. 10, 2022

(65) Prior Publication Data

US 2024/0050933 A1    Feb. 15, 2024

(51) Int. Cl.
| | |
|---|---|
| *B01J 37/03* | (2006.01) |
| *B01J 21/10* | (2006.01) |
| *B01J 23/28* | (2006.01) |
| *B01J 23/755* | (2006.01) |
| *C01B 3/40* | (2006.01) |

(52) U.S. Cl.
CPC ............ *B01J 37/031* (2013.01); *B01J 21/10* (2013.01); *B01J 23/28* (2013.01); *B01J 23/755* (2013.01); *C01B 3/40* (2013.01); *C01B 2203/0238* (2013.01); *C01B 2203/1058* (2013.01); *C01B 2203/1241* (2013.01)

(58) Field of Classification Search
CPC . B01J 37/031; B01J 21/10; B01J 23/28; B01J 23/755; C01B 3/40
See application file for complete search history.

(56) References Cited

U.S. PATENT DOCUMENTS

| | | |
|---|---|---|
| 5,714,132 A | 2/1998 | Kapoor et al. |
| 7,772,450 B2 | 8/2010 | Iaccino et al. |
| 8,586,500 B2 | 11/2013 | Kuperman et al. |
| 8,628,744 B2 | 1/2014 | Flytzani-Stephanopoulos et al. |
| 11,110,434 B2 | 9/2021 | Jiang et al. |
| 11,478,784 B2 | 10/2022 | Gascon et al. |
| 2001/0006615 A1 | 7/2001 | Badano |

(Continued)

FOREIGN PATENT DOCUMENTS

| | | |
|---|---|---|
| CN | 103586030 | 2/2014 |
| CN | 104258864 | 1/2015 |

(Continued)

OTHER PUBLICATIONS

U.S. Appl. No. 17/619,481, Dong et al., filed Dec. 15, 2021.

(Continued)

*Primary Examiner* — Anthony J Zimmer
*Assistant Examiner* — Annette H Phan
(74) *Attorney, Agent, or Firm* — Fish & Richardson P.C.

(57) ABSTRACT

The disclosure relates to catalysts for dry reforming, methods of producing the catalysts, and methods of using the catalysts in dry reforming. The catalysts contain nickel, molybdenum and a metal oxide. The methods of producing the catalysts include adding a solvent to precipitate the catalyst, followed by removing the solvent. The solvent addition and removal steps can be repeated as desired.

16 Claims, 18 Drawing Sheets

(56) References Cited

U.S. PATENT DOCUMENTS

| | | |
|---|---|---|
| 2012/0100062 A1 | 4/2012 | Nakamura et al. |
| 2013/0108538 A1 | 5/2013 | Ostuni et al. |
| 2016/0149244 A1 | 5/2016 | Abe et al. |
| 2018/0215618 A1 | 8/2018 | Kang et al. |
| 2019/0168206 A1 | 6/2019 | Yavuz et al. |
| 2019/0308183 A1 | 10/2019 | Agblevor et al. |
| 2020/0016578 A1 | 1/2020 | Mikhajlov et al. |
| 2020/0172394 A1 | 6/2020 | Han et al. |
| 2022/0119720 A1 | 4/2022 | Bielenberg et al. |
| 2022/0401915 A1 | 12/2022 | Koh et al. |
| 2023/0041936 A1 | 2/2023 | Cho et al. |
| 2023/0092115 A1 | 3/2023 | Han et al. |
| 2023/0183083 A1 | 6/2023 | Khowaiter et al. |
| 2023/0234841 A1 | 7/2023 | Chae et al. |

FOREIGN PATENT DOCUMENTS

| | | | |
|---|---|---|---|
| CN | 105561998 | | 5/2016 |
| CN | 113562701 A | | 10/2021 |
| DE | 202010012734 U1 | | 1/2012 |
| EP | 3988205 | | 4/2022 |
| GB | 2573885 A | | 11/2019 |
| KR | 10-2018-0043936 | | 5/2018 |
| WO | WO 2016069385 | | 5/2016 |
| WO | WO 2018026246 | | 2/2018 |
| WO | WO-2018026246 A1 | * | 2/2018 ............ B01J 21/10 |
| WO | WO 2019020376 A1 | | 1/2019 |
| WO | WO 2019043875 A1 | | 3/2019 |
| WO | WO 2021122584 A1 | | 6/2021 |

OTHER PUBLICATIONS

Jafarbegloo et al., "One-pot synthesis of NiO-MgO nanocatalysts for CO2 reforming of methane: The influence of active metal content on catalytic performance," J Nat Gas Sci Eng., 2015, 27:1165-1173, 23 pages.

Kawi et al., "Progress in synthesis of highly active and stable nickel-based catalysts for carbon dioxide reforming methane," Chemsuschem, 2015, 8(21):3556-3575, 20 pages.

Pakhare et al., "A review of dry CO2 reforming of methane over noble metal catalysts," Chem Soc Rev, 2014, 43(22):7813-7837, 25 pages.

Song et al., "Dry reforming of methane by stable Ni-Mo nanocatalysts on single crystalline MgO," Catalysis, Science, Feb. 2020, 367:777-781, 6 pages.

Wolfbeisser et al., "Methane dry reforming over ceria-zirconia supported Ni catalysts," Catal Today, 2016, 277:234-245, 12 pages.

Xie et al., "Immobilizing Ni nanoparticles to mesoporous silica with size and location control via a polyol-assisted route for coking and sintering resistant dry reforming of methane," Chem Commun, 2014, 50(55):7250-7253, 4 pages.

Zhang et al., "Coke-resistant Ni@SiO2 catalyst for dry reforming of methane," Appl Catal B-Environ, 2015, 176:513-521, 9 pages.

Berenschot, "Oxygen synergy for hydrogen production," TESN118016—Waterstofversneller, Dec. 2019, 97 pages.

Esposito, "Membraneless electrolyzers for low-cost hydrogen production in a renewable energy future," Joule, Dec. 2017, 1:651-658, 10 pages.

Huang et al., "Hydrogen generation by ammonia decomposition over Co/CeO2 catalyst: Influence of support morphologies," Applied Surface Science, 2020, 532:147335, 16 pages.

Huo et al., "Spatial confinement and electron transfer moderating MoN bond strength for superior ammonia decomposition catalysis," Applied Catalysis B: Environmental, 2021, 294:120254, 12 pages.

International Search Report and Written Opinion in International Appln. No. PCT/US2022/052654, mailed on Jan. 22, 2024, 13 pages.

Krishnan et al., "COx-free hydrogen generation via decomposition of ammonia over al, Ti and Zr-Laponite supported MoS2 catalysts," International Journal of Hydrogen Energy, 2020, 45(15):8568-8583, 16 pages.

Li et al., "Highly efficient Co/NC catalyst derived from ZIF-67 for hydrogen generation through ammonia decomposition," International Journal of Hydrogen Energy, Mar. 2022, 47(26):12882-12892, 11 pages.

Li et al., "Production of hydrogen by ammonia decomposition over supported Co3O4 catalysts," Catalysis Today, Sep. 2022, 402:45-51, 7 pages.

Lucentini et al., "Ammonia decomposition over 3D-printed CeO2 structures loaded with Ni," Applied Catalysis A: General, 2020, 591:117382, 31 pages.

Maleki et al., "Co-Ce-Al-O mesoporous catalysts for hydrogen generation via ammonia decomposition," International Journal of Hydrogen Energy, 2024, 51:267-275, 9 pages.

Parker et al., "Ammonia Decomposition Enhancement by Cs-Promoted Fe/Al2O3 Catalysts," Catalysis Letters, 2020, 150(12):3369-3376, 8 pages.

Pinzón et al., "COx-free hydrogen production from ammonia at low temperature using Co/SiC catalyst: Effect of promoter," Catalysis Today, May 2022, 390-391:34-47, 14 pages.

Su et al., "Fe-based catalyst derived from MgFe-LDH: Very efficient yet simply obtainable for hydrogen production via ammonia decomposition," International Journal of Hydrogen Energy, 2021, 46(61):31122-31132, 11 pages.

Zhang et al., "Techno-economic comparison of green ammonia production processes" Applied Energy, Feb. 2020, 259:114135, 12 pages.

SAIP Examination Report in SAIP Appln. No. 123450142, mailed on Sep. 22, 2025, 9 pages, with English Translation.

\* cited by examiner

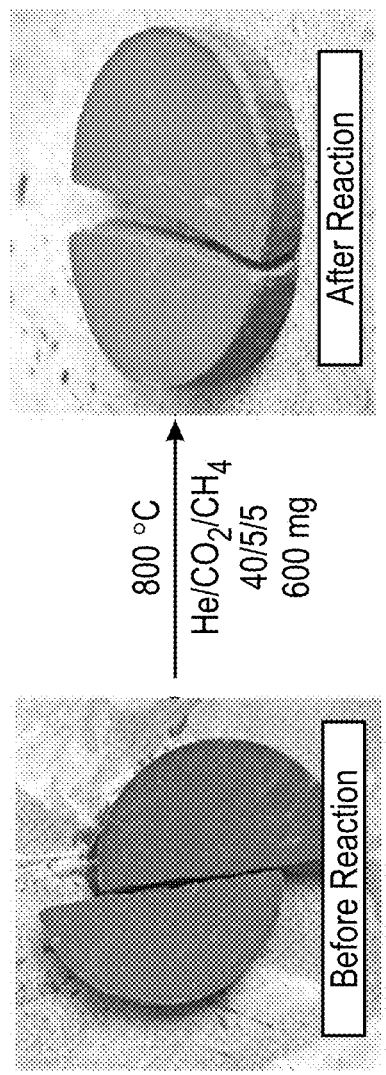
Figure 4C
Figure 4B
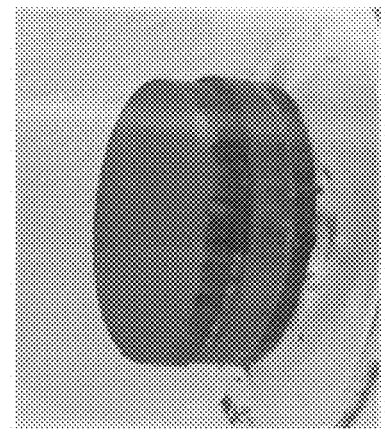
Figure 4A

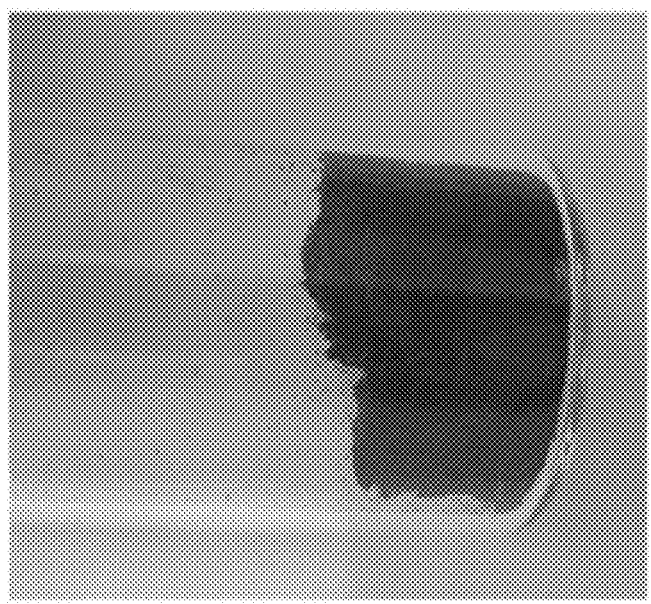
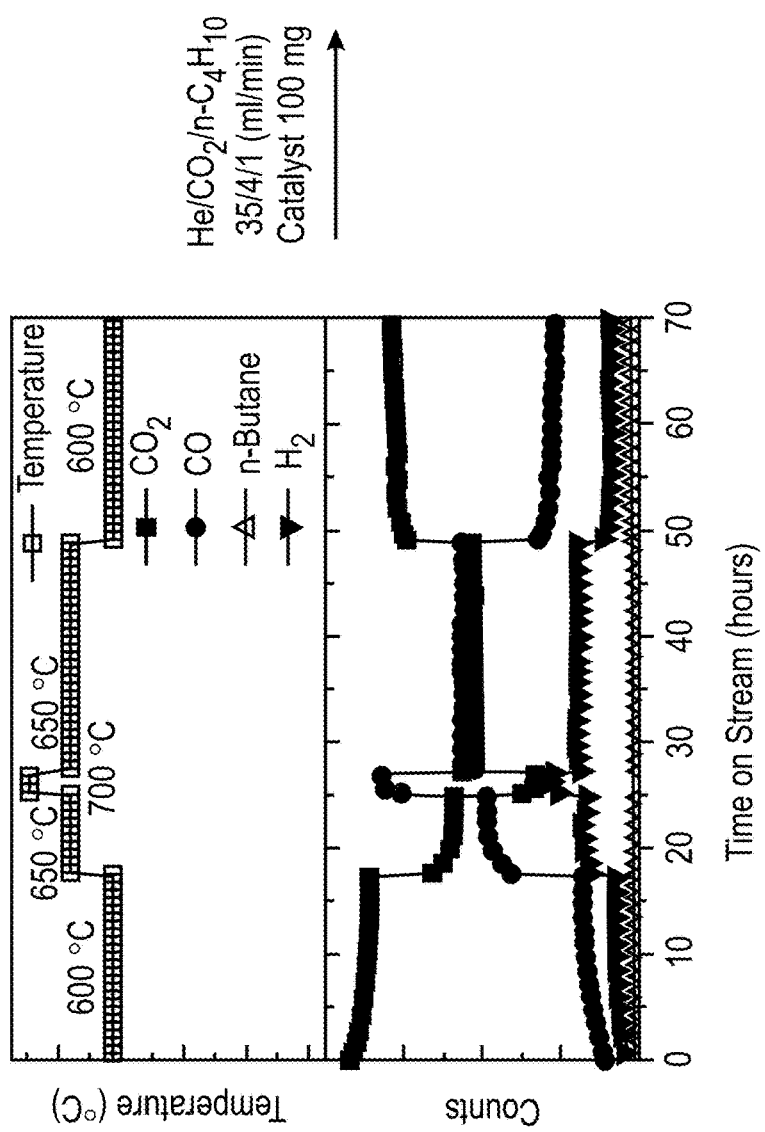
Figure 10B
Figure 10A

PeBaZAF Quant Result - Analysis Uncertainty: 20.92%

| Element | Wt % | Weight % | Atomic % | Error % | Net Int. | P/B Ratio | R | A | F |
|---|---|---|---|---|---|---|---|---|---|
| O K | 31.6 | 39.4 | 54.5 | 15.2 | 1656.0 | 0.00 | 1.0000 | 0.2263 | 1.0000 |
| Mg K | 36.2 | 45.0 | 41.0 | 4.7 | 6595.4 | 260.02 | 1.0105 | 1.0675 | 1.0020 |
| Ni K | 5.0 | 6.3 | 2.4 | 4.8 | 195.0 | 42.06 | 1.0387 | 1.0036 | 1.0912 |
| Mo L | 7.5 | 9.3 | 2.1 | 1.9 | 80.4 | 55.86 | 1.0200 | 1.0426 | 1.0020 |
| Total | 80.3 | 100.0 | | | | | | | |

CATALYSTS FOR DRY REFORMING AND METHODS OF PRODUCING THE SAME

FIELD

The disclosure relates to catalysts for dry reforming, methods of producing the catalysts, and methods of using the catalysts in dry reforming. The catalysts contain nickel, molybdenum and a metal oxide.

BACKGROUND

Nickel-containing catalysts can suffer from coke formation during reforming reactions (e.g., dry reforming reactions). Carbon structures (e.g., carbon nanotubes, carbon filaments) may grow on the surface of the nickel resulting in catalyst deactivation by blocking the nickel surface.

SUMMARY

The disclosure relates to catalysts for dry reforming, methods of producing the catalysts, and methods of using the catalysts in dry reforming. The catalysts contain nickel, molybdenum and a metal oxide. The methods of producing the catalysts include adding a solvent to precipitate the catalyst, followed by removing the solvent. The solvent addition and removal steps can be repeated as desired.

The catalysts and methods of the disclosure can enable the conversion of greenhouse gases (e.g., $CO_2$, $CH_4$) into useful chemical feedstocks (e.g., $H_2$, CO) via a dry reforming reaction. The catalysts may also be compatible with hydrocarbons containing C—C bonds (e.g., ethane, propane, butane) as reactants to form syngas in a dry reforming reaction. In some embodiments, the catalysts can be used in a dry reforming reaction with hydrocarbons containing C—C bonds (e.g., ethane, propane, butane) as reactants with less coking compared to other catalysts. The $H_2$ and CO generated from a dry reforming reaction using catalysts of the disclosure can be produced with a nearly stoichiometric ratio enabling use in downstream applications with relatively little (e.g., no) additional processing. The catalysts of the disclosure can have high activity and selectivity and relatively low costs compared to catalysts with other metal precursors. The catalysts can be relatively simple to activate and/or involve a relatively short activation time.

The methods of the disclosure may reduce the amount of organic residues in the catalyst compared to other methods of making catalysts. The catalysts and methods of producing the catalysts of the disclosure can provide relatively high coke resistance and/or high activity for dry reforming relative to other catalysts and methods of producing catalysts. The catalysts can undergo little (e.g., no) coke formation and/or sintering when used in high temperature (e.g., at least 700° C., such as at least 800° C.) dry reforming reactions. The catalysts may also undergo reduced coke formation and/or sintering when used in dry reforming reactions relative to other catalysts formed using different synthetic procedures. The catalysts and methods of the disclosure can increase product yields and/or safe operation time relative to other catalysts and methods of producing catalysts. The catalysts can be formed into pellets that are stable during reaction, including under high-pressure conditions. The methods of the disclosure can enable an increase in production speed and/or scale relative to other methods of producing catalysts.

The disclosure also provides methods of reactivating the catalysts. In some embodiments, catalysts may undergo coking when used in a dry reforming reaction at a temperature of less than 800° C. (e.g., 700° C., less than 600° C.). The catalysts can be reactivated to remove coke and be used in a dry reforming reaction. In some embodiments, the catalysts can be reactivated relatively quickly (e.g., less than 1 hour).

In a first aspect, the disclosure provides a method, including: a) dissolving a nickel precursor, a molybdenum precursor and a metal oxide in a first solvent to provide a mixture; b) adding a second solvent to the mixture to precipitate a catalyst from the mixture, wherein the precipitated catalyst forms a first layer and the first solvent and the second solvent form a second layer; and c) removing the second layer, wherein the catalyst includes nickel, molybdenum and the metal oxide.

In some embodiments, the method further includes repeating b) and c) at least three times.

In some embodiments, the second solvent includes a polar solvent.

In some embodiments, the second solvent includes acetone, toluene, ethanol, ethyl acetate, propanol, butanol, methanol, dichloromethane, and/or acetonitrile.

In some embodiments, the second solvent includes ethanol.

In some embodiments, the method further includes, after c), isolating the catalyst from the first solvent, and drying the isolated catalyst.

In some embodiments, the nickel precursor includes $NiCl_2$, $NiCl_2 \cdot 6H_2O$, $Ni(NO_3)_2$, $NiSO_4$, $Ni(NH_4)_2$, $Ni(SO_4)_2 \cdot 6H_2O$, $Ni(OCOCH_3)_2 \cdot 4H_2O$, $NiBr_2$, $NiCO_3$, $NiF_2$, $NiI_2$, $NiC_2O_4 \cdot 2H_2O$ and/or $Ni(ClO_4)_2 \cdot 6H_2O$; and the molybdenum precursor includes $Mo(CO)_6$, $MoO_3$, $Na_2MoO_4$, $CaMoO_4$, $ZnMoO_4$ and/or $(NH_4)_6 Mo_7O_2 \cdot 4H_2O$.

In some embodiments, the metal oxide includes $ZrO_2$, MgO, $TiO_2$, $Al_2O_3$, $SiO_2$, $CrO_2$, $Fe_2O_3$, $Fe_3O_4$, CuO, ZnO, CaO, $Sb_2O_4$, $Co_3O_4$, $Fe_3O_4$, $Pb_3O_4$, $Mn_3O_4$, $Ag_2O_2$, $U_3O_8$, $Cu_2O$, $Li_2O$, $Rb_2O$, $Ag_2O$, $Tl_2O$, BeO, CdO, TiO, $GeO_2$, $HfO_2$, $PbO_2$, $MnO_2$, $TeO_2$, $SnO_2$, $La_2O_3$, $Fe_2O_3$, $CeO_2$, $WO_2$, $UO_2$, $ThO_2$, $TeO_2$, $MoO_2$, and/or $MoO_3$.

In some embodiments, the metal oxide includes MgO.

In some embodiments, the first solvent includes water and ethylene glycol.

In some embodiments, a) further includes including a reducing agent in the mixture.

In some embodiments, a) further includes including a surfactant to the mixture.

In some embodiments, the nickel precursor includes $NiCl_2$ $6H_2O$, the molybdenum precursor includes $(NH_4)_6Mo_7O_2$ $4H_2O$, and the metal oxide includes MgO.

In some embodiments, a weight ratio of nickel from the nickel precursor to metal oxide in the mixture is 0.01 wt. % to 40 wt. %.

In some embodiments, a weight ratio of molybdenum from the molybdenum precursor to the metal oxide in the mixture is from 0.01 wt. % to 39.9 wt. %.

In some embodiments, the method further includes, after c), using the catalyst in a dry reforming reaction.

In some embodiments, the dry reforming reaction includes reacting carbon dioxide and a $C_1$-$C_4$ hydrocarbon to make carbon monoxide and hydrogen.

In some embodiments, the method further includes, after using the catalyst in a dry reforming reaction, removing coke from the catalyst.

In a second aspect, the disclosure provides a method, including: a) dissolving a first precursor, a second metal precursor and a metal oxide in a first solvent to provide a mixture; b) adding a second solvent to the mixture to precipitate a catalyst from the mixture, wherein the precipitated catalyst forms a first layer and the first solvent and the second solvent form a second layer, respectively; and c) removing the second layer, wherein the catalyst includes a first metal of the first metal precursor, a second metal of the second metal precursor and the metal oxide.

In certain embodiments, the method further includes repeating b) and c) at least three times.

BRIEF DESCRIPTION OF THE FIGURES

FIGS. 4a-4c show a series of photographs of pellets of a catalyst.

FIG. 10a shows experimental data of reactant conversions and product yields for a dry reforming reaction FIG. 10b is a photograph of a catalyst after a dry reforming reaction.

DETAILED DESCRIPTION

Methods of Making Catalysts

Figure 1:
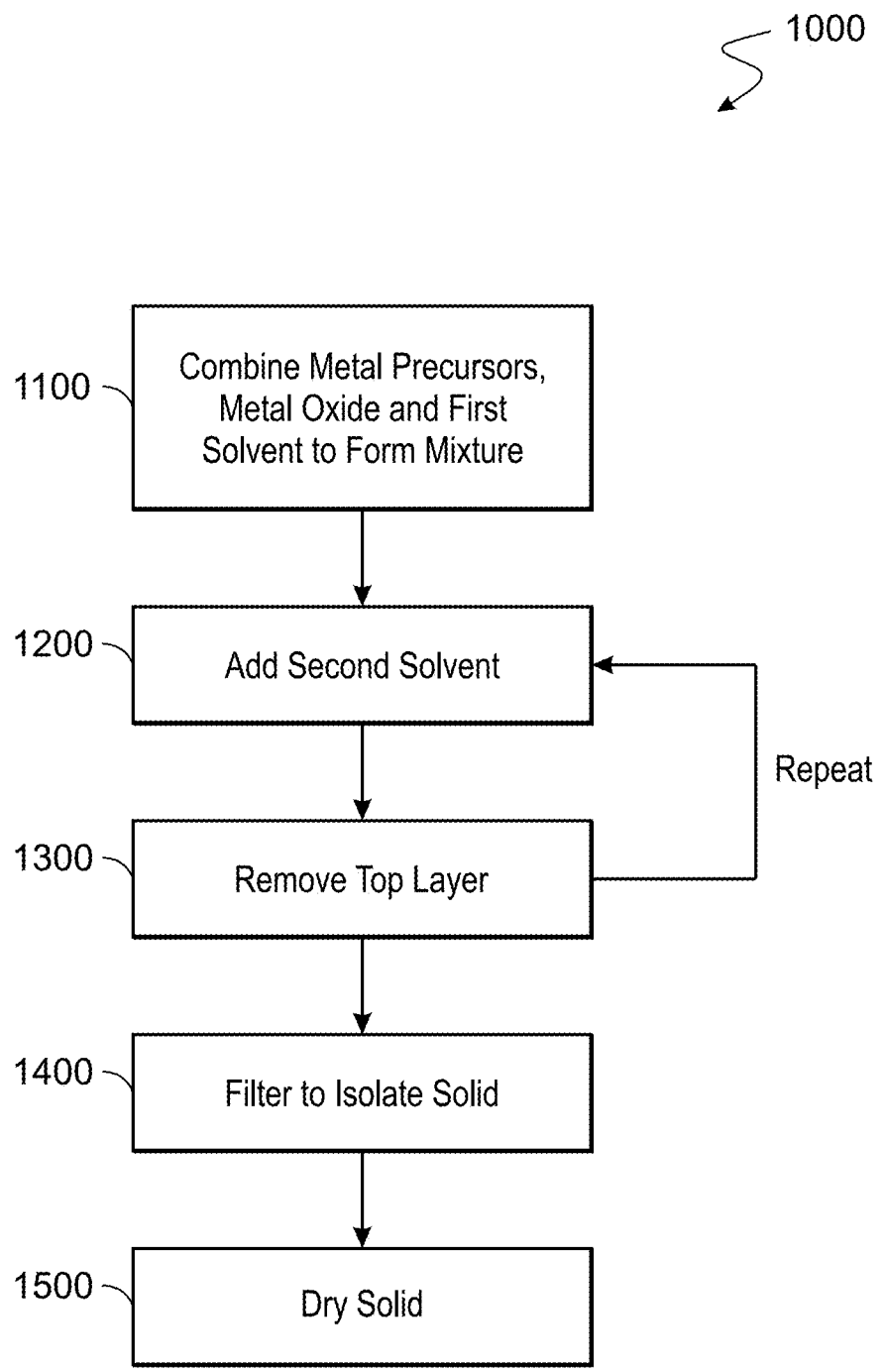
FIG. 1 is a flow chart of a method of making a catalyst.

FIG. 1 is a flow chart of steps in a method 1000 of making a catalyst.

In step 1100, a nickel precursor, a molybdenum precursor and a metal oxide are combined with a first solvent to form a mixture in which the precursors and metal oxide react to form the catalyst.

In step 1200, a second solvent is added to the mixture prepared in step 1100. Addition of the second solvent causes the catalyst to precipitate from the mixture. Thus, the precipitated catalyst forms a bottom layer and the first and second solvent forms a top layer that includes the first and second solvents.

In step 1300, the top layer is removed. The top layer can be removed by pouring it off while removing little, if any of the bottom layer (the precipitated catalyst).

Without wishing to be bound by theory, it is believed that organic residue (e.g., polymerized first solvent, a surfactant used in the synthesis such as Polyvinylpyrrolidone) present in the catalyst dissolves in the second solvent and remains in the top layer. The steps 1200 and 1300 may therefore remove organic residue from the catalyst. Without wishing to be bound by theory, it is believed that the first solvent can undergo polymerization during the reaction (e.g., ethylene glycol can be polymerized by basic catalysts such as NaOH, KOH, and $Na_2CO$ to form polyethylene glycol) and the organic residues can include the polymerized first solvent. Also without wishing to be bound by theory, it is believed that removing the organic residue from the catalyst may reduce (e.g. prevent) the formation of coke on the catalyst during use of the catalyst in a dry reforming reaction and/or may increase the performance of the catalyst (e.g., shorter activation time, higher catalyst activity, improved mechanical stability of pellets).

Generally, the steps 1200 and 1300 are repeated (e.g. at least 2 times, at least 3 times, at least 4 times, at least 5 times) to enhance the removal of organic residue from the catalyst. Typically, in each repetition of step 1200, the second solvent that is added is fresh (not previously used). Thus, each repetition of steps 1200 and 1300 can potentially remove additional organic residue from the catalyst. In some embodiments, the steps 1200 and 1300 are repeated until the top layer is clear. This can indicate that little, if any, organic residue is present in the top layer, which, in turn, can indicate that much (e.g., all) of the organic residue has been removed from the catalyst. In some embodiments, the steps 1200 and 1300 are repeated until the viscosity of the solution prior to separation (i.e., the catalysts, first solvent, polymerized first solvent) decreases, which can similarly indicate that much (e.g., all) of the organic residue has been removed from the catalyst. Without wishing to be bound by theory, it is believed that the polymerized first solvent can increase the viscosity of the solution prior to its removal.

In step 1400, the precipitated catalyst is isolated from the first solvent (e.g., via filtration). In step 1500, the isolated catalyst is dried.

Examples of nickel precursors includes $NiCl_2$, $NiCl_2 \cdot 6H_2O$, $Ni(NO_3)_2$, $NiSO_4$, $Ni(NH_4)_2$, $Ni(SO_4)_2 \cdot 6H_2O$, $Ni(OCOCH_3)_2 \cdot 4H_2O$, $NiBr_2$, $NiCO_3$, $NiF_2$, $NiI_2$, $NiC_2O_4 \cdot 2H_2O$, and $Ni(ClO_4)_2 \cdot 6H_2O$. In certain embodiments, the amount of nickel from the nickel precursor is at least 0.01 (e.g., at least 0.1, at least 1, at least 2, at least 5) wt. % and at most 40 (e.g., at most 30, at most 20, at most 10) wt. % relative to the metal oxide.

Examples of molybdenum precursors include $Mo(CO)_6$, $MoO_3$, $Na_2MoO_4$, $CaMoO_4$, $ZnMoO_4$ and $(NH_4)_6Mo_7O_2 \cdot 4H_2O$. In some embodiments, the amount of the molybdenum from the molybdenum precursor is at least 0.01 (e.g., at least 0.1, at least 1, at least 2, at least 5) wt. % and at most 39.9 (e.g., at most 30, at most 20, at most 10) wt. % relative to the metal oxide.

Examples of metal oxides (used in step 1100) include $ZrO_2$, $MgO$, $TiO_2$, $Al_2O_3$, $SiO_2$, $CrO_2$, $Fe_2O_3$, $Fe_3O_4$, $CuO$, $ZnO$, $CaO$, $Sb_2O_4$, $CO_3O_4$, $Fe_3O_4$, $Pb_3O_4$, $Mn_3O_4$, $Ag_2O_2$, $U_3O_8$, $Cu_2O$, $Li_2O$, $Rb_2O$, $Ag_2O$, $Tl_2O$, $BeO$, $CdO$, $TiO$, $GeO_2$, $HfO_2$, $PbO_2$, $MnO_2$, $TeO_2$, $SnO_2$, $La_2O_3$, $Fe_2O_3$, $CeO_2$, $WO_2$, $UO_2$, $ThO_2$, $TeO_2$, $MoO_2$, and $MoO_3$. In certain embodiments, the amount of the metal oxide is at least 60 (e.g., at least 70, at least 80, at least 90, at least 95) wt. % and at most 99.9 wt % (e.g., at most 99, at most 95, at most 90, at most 80, at most 70) wt. %.

Generally, the first solvent (introduced in step 1100) includes a polar solvent. In some embodiments, the first solvent (introduced in step 1100) contains water, ethylene glycol, N-methylpyrrolidone, Dimethylformamide, acetone, toluene, ethanol, ethyl acetate, propanol, butanol, methanol, dichloromethane, acetonitrile and/or isopropyl alcohol. In some embodiments, the first solvent contains at least 0.01 (e.g., at least 0.1, at least 1, at least 5, at least 10) percent by volume (vol. %) and at most 20 (e.g., at most 15, at most 10, at most 5, at most 1) vol. % water. In some embodiments, the first solvent contains at least 80 (e.g., at least 85, at least 90, at least 95) and at most 100 (e.g., at most 99.9, at most 99, at most 95, at most 90) vol. % ethylene glycol. Without wishing to be bound by theory, it is believed that the amount of water in the first solvent should be minimized as an excessive amount of water can react with MgO to generate $Mg(OH)_2$. Without wishing to be bound by theory, it is believed that the role of water in the first solvent is to dissolve the metal ions $Ni^{2+}$ and $Mo^{7+}$.

Generally, a reducing agent is added in step 1100. Examples of reducing agents include hydrazine, NaOH, $NaBH_4$, $LiAlH_4$, diisobutylaluminum hydride (DIBAL-H) and/or diborane. In certain embodiments, an amount of the reducing agent is at least 0.5 (e.g., at least 1, at least 2, at least 5) mole percent (mol. %) and at most 10 (e.g., at most 5, at most 2) mol. % relative to the amount of nickel.

In certain embodiments, a surfactant is added in step 1100. Examples of surfactants include polyvinylpyrrolidone (PVP), oleylamine, oleic acid, benzyl ether, trioctylphosphine, octa Decylamine, hexadecylamine, cetyl trimethylammonium bromide (CTAB), polyethyleneglycol (PEG), 1,2-hexadecanediol and 1-octadecene. In certain embodiments, an amount of the surfactant is at least 0.01 (e.g., at least 0.1, at least 1, at least 5, at least 10) wt. % and at most 25 (e.g., at most 20, at most 15, at most 10, at most 5) wt. %.

In some embodiments, the step 1100 includes the synthesis as described in WO/2018/026246. PCT Patent No. WO/2018/026246, which is directed to dry reforming catalysts using a metal oxide support, and is hereby incorporated by reference in its entirety and for all purposes.

In general, the second solvent (introduced in step 1200) is a polar solvent. Examples of polar solvents include acetone, toluene, ethanol, ethyl acetate, propanol, butanol, methanol, dichloromethane, and acetonitrile. In some embodiments, the polar solvent has a boiling point of less than 100 (e.g., less than 90, less than 80) ° C.

Without wishing to be bound by theory, it is believed that extending the time for the precipitation in step 1200 can increase the amount of time the catalyst has to settle, thereby increasing the product yield. However, if too much time is given for the precipitation step (e.g., at least 3 days) the organic contaminants may also precipitate. In certain embodiments, the step 1200 takes at least 5 (e.g., at least 10, at least 15 minutes) and at most 3 (e.g., at most 2, at most 1) days.

Without wishing to be bound by theory, it is believed that the filtration step 1400 takes less time than other methods (e.g., WO/2018/026246) as the mixture has a lower viscosity due to the removal of ethylene glycol and/or polymerized ethylene glycol in the steps 1200 and 1300. This may result in reduced oxidation of a surface of the catalyst from exposure to air and the ability to scale production. In certain embodiments, the filtering in step 1400 takes at least 5 (e.g., at least 10, at least 15, at least 20, at least 30) minutes and at most 3 days (e.g., at most 2 days, at most 1 day, at most 12 hours, at most 10 hours, at most 5 hours, at most 3 hours, at most 2 hours, at most 1 hours, at most 30 minutes).

In general, any appropriate filter medium can be used in the step 1400. Examples of filter media that can be used in step 1400 include paper filters and membrane filters (e.g., hydrophilic membrane filters, such as nylon-containing hydrophilic membranes).

In general, the step 1500 includes heating the catalyst.

In some embodiments, the step 1500 includes heating the catalyst under vacuum, such as by using a vacuum oven. In certain embodiments the step 1500 includes heating the catalyst to a temperature of at least 40 (e.g., at least 50, at least 60) ° C. and at most 150 (e.g. at most 140, at most 130) ° C., for a duration of at least 3 (e.g. at least 4, at least 5) hours in a vacuum oven. As an example, in some embodiments, the step 1500 includes heating the catalyst to a temperature of 80° C. for a duration of 3 hours in a vacuum oven.

In some embodiments, the step 1500 includes heating the catalyst in a drying oven. In certain embodiments, the step 1500 includes heating the catalyst to a temperature of at least 50 (e.g., at least 60, at least 70) ° C. and at most 200 (e.g. at most 190, at most 180) ° C., for a duration of at least 5 (e.g. at least 6, at least 7) hours in a drying oven. As an example, in some embodiments, the step 1500 includes heating the catalyst to a temperature of 120° C. for a duration of 5 hours in a drying oven.

Figure 2:
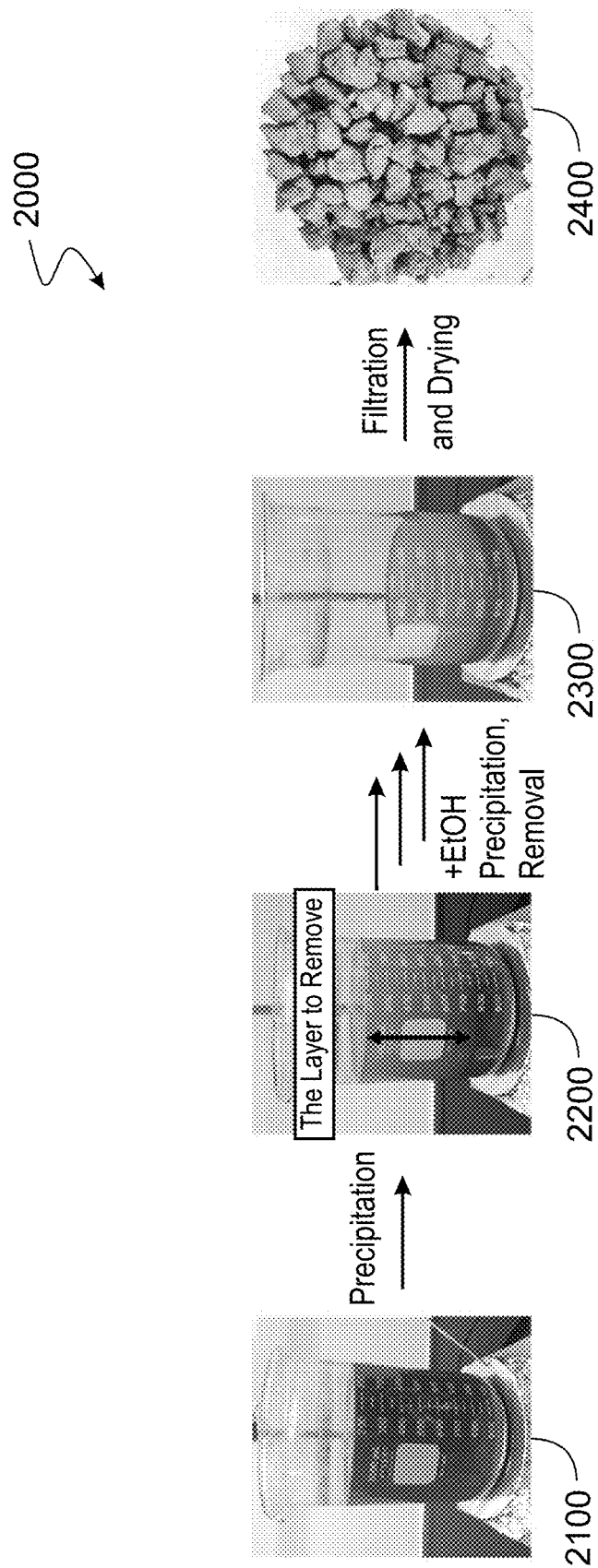
FIG. 2 is a series of photographs showing steps in a method of making a catalyst.

FIG. 2 depicts a series of photographs of a method of making a catalyst. In photograph 2100, the nickel precursor, the molybdenum precursor, metal oxide and first solvent are combined to form a black mixture. In photograph 2200, the second solvent (e.g. ethanol) is added to precipitate the catalyst and form a lower layer containing the precipitated catalyst and a top layer containing the first and second solvents. The top layer can be removed by pouring it off. Photograph 2300 shows that, after the second solvent has been added and removed several times, the mixture is has a substantially lighter color than compared to the color of the mixture in photograph 2100. Photograph 2400 shows the catalyst obtained from filtering and drying the mixture of photograph 2300.

Catalyst Compositions and Use

Generally, the catalyst contains nickel (from the nickel precursor), molybdenum (from the molybdenum precursor) and the metal oxide.

In some embodiments, an amount nickel in the catalyst is at least 0.01 (e.g., at least 0.1, at least 1, at least 5, at least 10) wt. % and at most 99.9 (e.g., at most 99, at most 95, at most 90) wt. % of the nickel and molybdenum content. In some embodiments, an amount of molybdenum in the catalyst is at least 0.01 (e.g., at least 0.1, at least 1, at least 5, at least 10) wt. % and at most 99.9 (e.g., at most 99, at most 95, at most 90) wt. % of the nickel and molybdenum content.

In some embodiments, the metal oxide is magnesium oxide. In some embodiments, an amount of the metal oxide in the catalyst is at least 60 (e.g., at least 70, at least 80, at least 90, at least 95) wt. % and at most 99.9 (e.g., at most 99, at most 95, at most 90, at most 80, at most 70) wt. %.

Generally, the catalysts of the disclosure can be used for a dry reforming reaction. In certain embodiments, the reactants of the dry reforming reaction are carbon dioxide and a $C_1$-$C_4$ hydrocarbon (e.g., methane, ethane, propane, butane). In certain embodiments, the products of the dry reforming reaction are carbon monoxide and hydrogen gas. In some embodiments, the carbon monoxide and hydrogen gas are produced with a molar ratio of at least 0.97:1 (e.g., at least 0.98:1, at least, 0.99:1) and at most 1:1.03 (e.g. at most 1:1.02, at most 1:1.01)) under dry reforming of methane.

In some embodiments, the catalysts have a carbon dioxide conversion of at least 70 (e.g., at least 80, at least 90) % and at most 100 (e.g., at most 90, at most 80) % at a gas hourly space velocity (GHSV) of at least 10000 mL/g/h to at most 30000 mL/g/h, a temperature of 800° C. and a pressure of at least 1 bar and at most 20 bar. In some embodiments, the catalysts have a methane conversion of at least 70 (e.g., at least 80, at least 90) % and at most 100 (e.g., at most 90, at most 80) % at a GHSV of at least 10000 mL/g/h to at most 30000 mL/g/h, a temperature of 800° C. and a pressure of at least 1 bar and at most 20 bar. In some embodiments, the catalysts have a n-butane conversion of at least 99 (e.g., at least 99.5, at least 99.9) % and at most 100 (e.g., at most 99.9, at most 99.5) % at a GHSV of at least 10000 mL/g/h to at most 30000 mL/g/h, a temperature of 800° C. and a pressure of at least 1 bar and at most 20 bar. In some embodiments, the catalysts have a yield of carbon monoxide of at least 70 (e.g., at least 80, at least 90) % and at most 100 (e.g., at most 90, at most 80) % at a GHSV of at least 10000 mL/g/h to at most 30000 mL/g/h, a temperature of 800° C. and a pressure of at least 1 bar and at most 20 bar. In some embodiments, the catalysts have a yield of hydrogen gas of at least 70 (e.g., at least 80, at least 90) % and at most 100 (e.g., at most 90, at most 80) % at a GHSV of at least 10000 mL/g/h to at most 30000 mL/g/h, a temperature of 800° C. and a pressure of at least 1 bar and at most 20 bar.

Without wishing to be bound by theory, it is believed that coke can be removed from the catalysts during a dry reforming of methane reaction. Without wishing to be bound by theory, it is believed that a relatively high temperature (e.g., at least 700° C.) used in a dry reforming reaction can reduce oxidized surfaces and/or remove organic residues on the catalyst's surface which lower catalytic activity.

Without wishing to be bound by theory, it is believed that hydrogen gas can be consumed to remove carbon structure on the catalyst surface and $CO_2$ can remove the carbon structure at high temperatures ($CO_2+C\rightarrow 2CO$, Boudouard reaction). This reaction is believed to proceed as the catalyst surface is not fully covered by coking. In some embodiments, coke can be removed from a surface of the catalysts under a $CO_2$ atmosphere at a temperature of 800-850° C.

Without wishing to be bound by theory, it is believed that heat treatment at 400-500° C. under inert conditions or an atmosphere containing hydrogen gas and nitrogen gas can remove organic residue and adsorbed solvent to generate mechanically strong pellets.

EXAMPLES

All chemicals were purchased from Sigma Aldrich except for MgO. MgO is manufactured by Dickinson Corporation, US.

Comparative Example 0.404 g of nickel(II) chloride hexahydrate ($NiCl_2$ $6H_2O$) and 36 mg of ammonium heptamolybdate tetrahydrate, $(NH_4)_6Mo_7O_2$ $4H_2O$ were dissolved in 1 mL of water and 24 mL of Ethylene glycol, then 0.3 g of polyvinylpyrrolidone (PVP, ~55,000 MW) was added to and the solution was stirred. 0.9 g of magnesium oxide was added and the temperature was raised to 80° C. with stirring. To this solution, a hydrazine solution (1.7 g/Ethylene glycol 5 mL) was added and the color of the solution changed to dark gray. Nickel and molybdenum ions were reduced and impregnated on the magnesium oxide surface while the color of the solution turned to black. After 1 hour of stirring, then cooling the solution to room temperature, the catalyst was filtered and washed with water while being filtered. The filtration was performed using filter paper (diameter 55 mm, 100 circles CAT No. 1004-005, Whatman™) on a ceramic funnel connected to a vacuum pump. The collected solid was dried under 120° C. for 5 h.

Example 1—Synthesis 121.1 g of nickel precursor ($NiCl_2$ $6H_2O$) and 11.04 g of molybdenum precursor (ammonium heptamolybdate tetrahydrate, $(NH_4)_6Mo_7O_2$ $4H_2O$) were dissolved in 100 mL of water and 1.5 L of Ethylene glycol, then 114 g of PVP (polyvinylpyrrolidone, ~55,000 MW) was added and the mixture was stirred. 270 g of magnesium oxide (MgO) was added, and the temperature was raised to 80° C. with stirring. To this solution, 1.5 L of hydrazine monohydrate solution (5 M, mixed with Ethylene glycol) was added, and the color of the solution changed to dark gray. Then 3 L of NaOH solution (0.3 M of NaOH with Ethylene glycol) was added. Nickel and molybdenum were reduced by hydrazine and NaOH solution and impregnated on the magnesium oxide surface while the color of the solution turned to black. After stirring for 1 hour, 1.5 L of ethanol was added and causing the catalyst to precipitate. When the layers separated, the top layer was removed. 1.0 L of ethanol was added. The process was performed three times, and the viscosity of the solution decreased as the ethylene glycol was diluted. Additionally, the color of the top layer became clear and transparent. The bottom (solid) layer was filtered using filter paper (diameter 320 mm, 100 circles, CAT No. 1004-320, Whatman™) on a ceramic funnel connected to a vacuum pump. After collecting the catalyst, it was dried at 120° C. for 5 hours. The amount of reactants used was a 300 times scale relative to the comparative example Example 2—Dry Reforming Reaction The catalytic activity of catalysts prepared in the comparative example and in Example 1, without and with the ethanol precipitation and removal steps respectively, were measured in a dry reforming reaction of methane and carbon dioxide. The dry reforming reaction had a stoichiometry of:

$$CH_4+CO_2\rightarrow 2CO+2H_2$$

The reaction was performed with 100 mg of catalyst in a reactor tube with an inner diameter (i.d.) of 9 mm at a temperature of 800° C. and pressure of 1 bar. A feed gas containing methane, carbon dioxide and helium in a ratio of 5:5:40 mL/min at a gas hourly space velocity (GHSV) of 30 L $g_{cat}^{-1}$ $h^{-1}$ was used. The experiment was performed in an Inconel reactor, and the amounts of reactants and products after the dry reforming reaction were measured using a flame ionization detector (FID) for detecting hydrocarbons and two thermal conductivity detectors (TCD) for CO, $CO_2$, $CH_4$, $H_2$, He detection (450-GC, Varian Inc., Netherlands). The reaction was allowed to proceed for 20 hours.

Figure 3A:
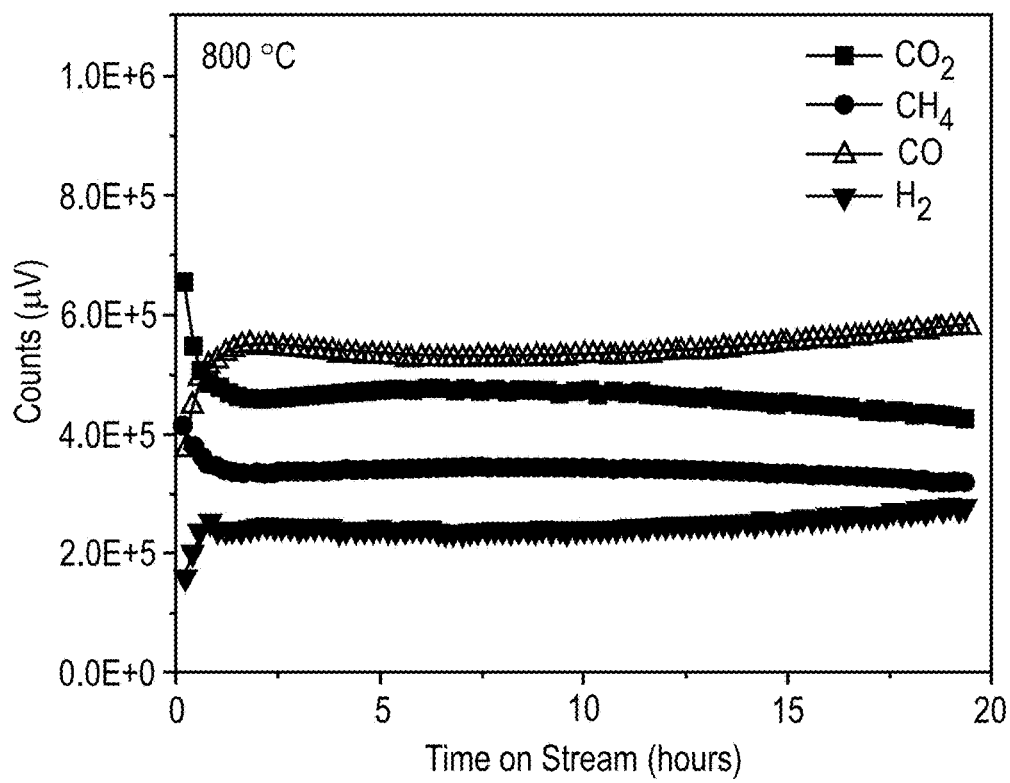
FIGS. 3a and 3b show experimental data of reactant conversions and product yields for a dry reforming reaction.
Figure 3B:
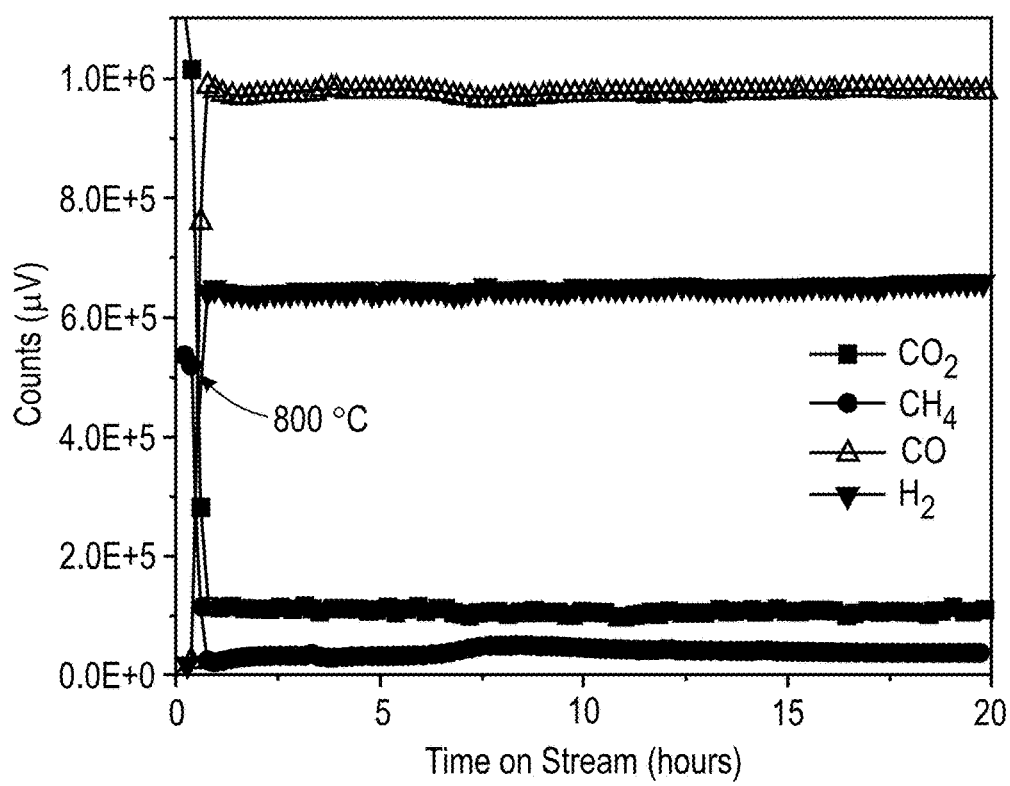

FIG. 3a shows results from the catalyst without ethanol precipitation (comparative example) and FIG. 3b shows the results from the catalyst with ethanol precipitation (Example 1). The catalyst without ethanol precipitation (comparative example) had a longer activation time relative to the catalyst with ethanol precipitation (Example 1) and increasing catalytic activity over the course of the reaction, suggesting that the catalytic activity was not at the maximum and organic residue was being removed. In FIG. 3b, once the reaction temperature was 800° C., most of the reactants ($CH_4$ and $CO_2$) were being converted without a change in the catalytic activity, suggesting that the wash steps were successful in removing organic residue.

Example 3—Pellet Stability Test

A stability test after pelletization was conducted. A hydraulic pelletizer (Atlas Manual Hydraulic Press 25 T, Specac) was used to make pellets of the catalyst of Example 1. The weight used ranged from 500-10,000 kg, the pellet diameter was 13 mm, and the thickness depended on the amount of sample added. FIG. 4a shows several of the pellets formed. FIG. 4b shows a pellet formed with a weight of 5,000 kg applied to 600 mg of catalyst before use in a dry reforming reaction. The pellet had a height of 2 mm. The range of preferred pellet density is 1.5 to 4.0 g/mL.

The pellet of FIG. 4b was used in a dry reforming reaction at a temperature of 800° C. and pressures of 1 bar and 5 bar. The catalyst bed temperature was raised to 800° C. under nitrogen (10 mL/min) using the furnace controllers. Once the temperature was stable at 800° C., the reaction was initiated by adding a feed gas containing helium, carbon dioxide and methane in a ratio of 80:10:10 mL/min at a GHSV of 10,000 mL/h/g. The helium was added for mass balance checks. The reaction was allowed to proceed for 9 hours then the pressure was increased to 5 bar. Effluent gas was monitored by gas chromatograph (Tracera, Shimadzu) equipped with barrier discharge ionization detector (BID) or mass spectrometer (OmniStar™, Pfeiffer Vacuum). GC and MS were calibrated with the mixture of $H_2$, He, CO, $CH_4$, and $CO_2$.

Figure 5:
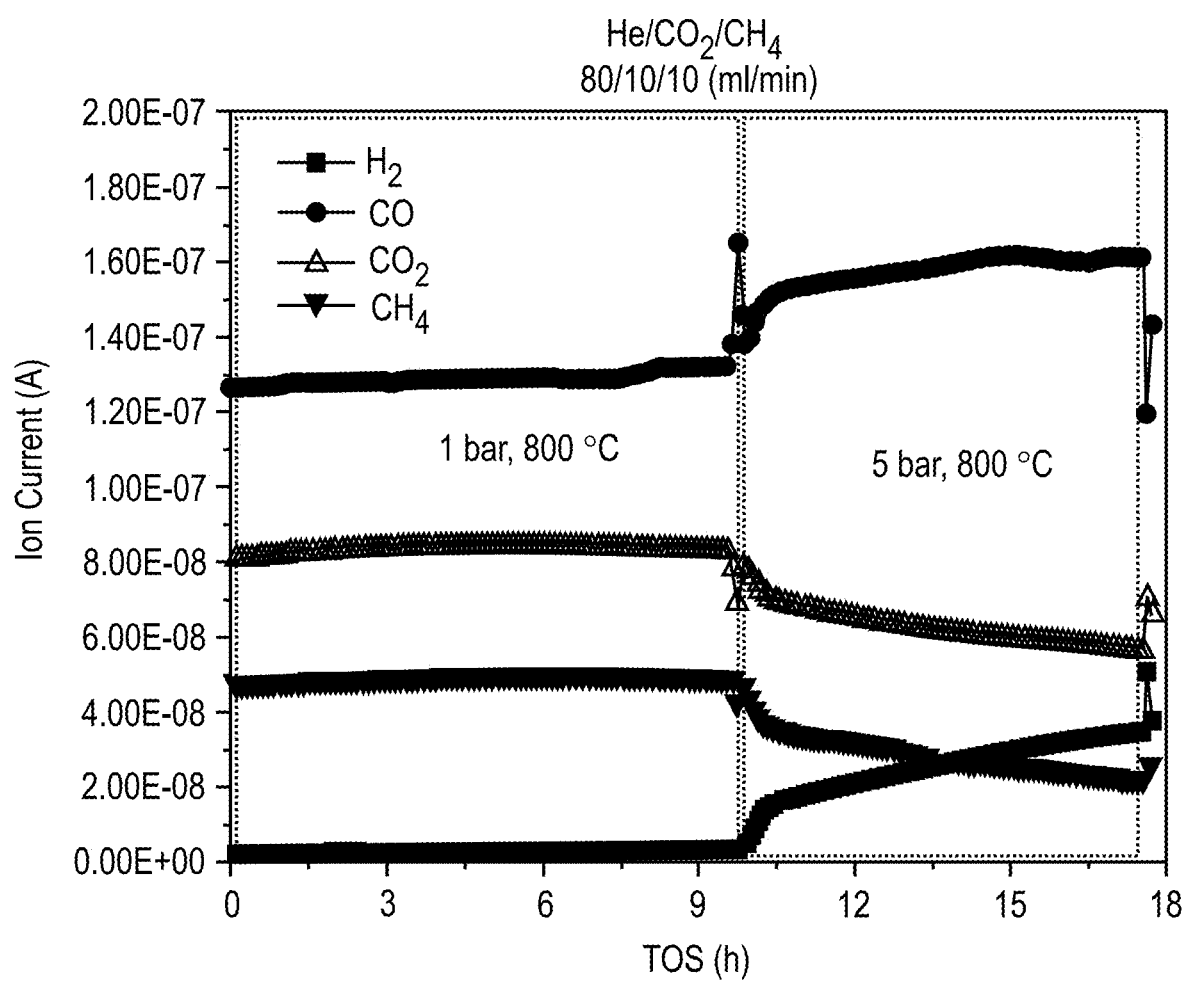
FIG. 5 shows experimental data of reactant conversions and product yields for a dry reforming reaction.

The results are presented in FIG. 5. Due to the absence of organic residues in the pellets, the reaction proceeded stability without coking and the pellet maintained its shape at both 1 and 5 bar pressure conditions. FIG. 4c shows the pellet from 4b after use in a dry reforming reaction.

Example 4—Dry Reforming of C—C Bonded Hydrocarbon

To assess the dry reforming performance on $C_2$-$C_n$, n>2 hydrocarbons, the dry reforming performance on a gas mixture containing helium, carbon dioxide and n-butane (dry reforming of butane (DRB)) at a ratio of 35:4:1 ml/ml and a GHSV of 24,000 mL/h/g at a temperature of 800° C. and a pressure of 1 bar was measured. 100 mg of catalyst was loaded on fixed bed Inconel reactor and the reagent gases were injected (total flow: 50 mL/min, He/$CO_2$/$CH_4$=35/4/4). After 24 hours, the reactant gases switched to from DRM to DRB (total flow: 40 mL/min, He/$CO_2$/n-$C_4H_{10}$=30/9/1). The reaction was terminated after a total reaction time of 60 hours.

Figure 6:
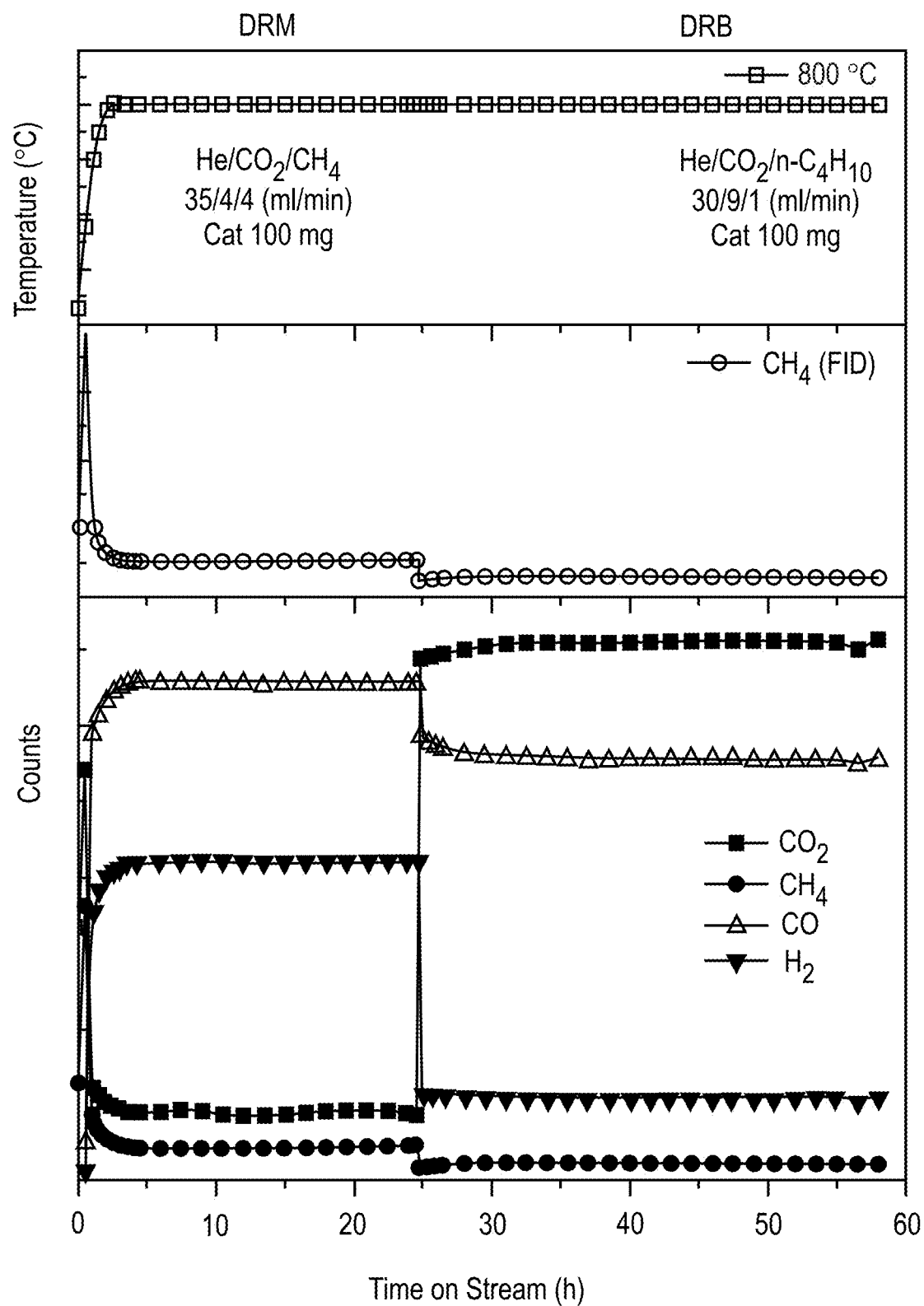
FIG. 6 shows experimental data of reactant conversions and product yields for a dry reforming reaction.

The dry reforming performance on methane and n-butane gas at a temperature of 800° C. is shown in FIG. 6. The conversion of butane was close to 100% so no butane was observed by the FID. The catalytic activity for DRM and DRB are summarized in Table 1.

TABLE 1

Summarized catalytic activity in DRM and DRB at 800° C., 1 bar

| Reaction | $CH_4$ conversion (%) | $C_4H_{10}$ conversion (%) | $CO_2$ conversion (%) | $H_2$/CO ratio (Ideal value) | Reaction condition |
|---|---|---|---|---|---|
| DRM | 95 | — | 98 | 0.97 (1.0) | He/$CO_2$/$CH_4$ = 40/5/5 30,000 mL/g/h |
| DRB | — | 100 | 73 | 0.5 (0.65) | He/$CO_2$/n-$C_4H_{10}$ = 35/4/1 24,000 mL/g/h |

Figure 7:
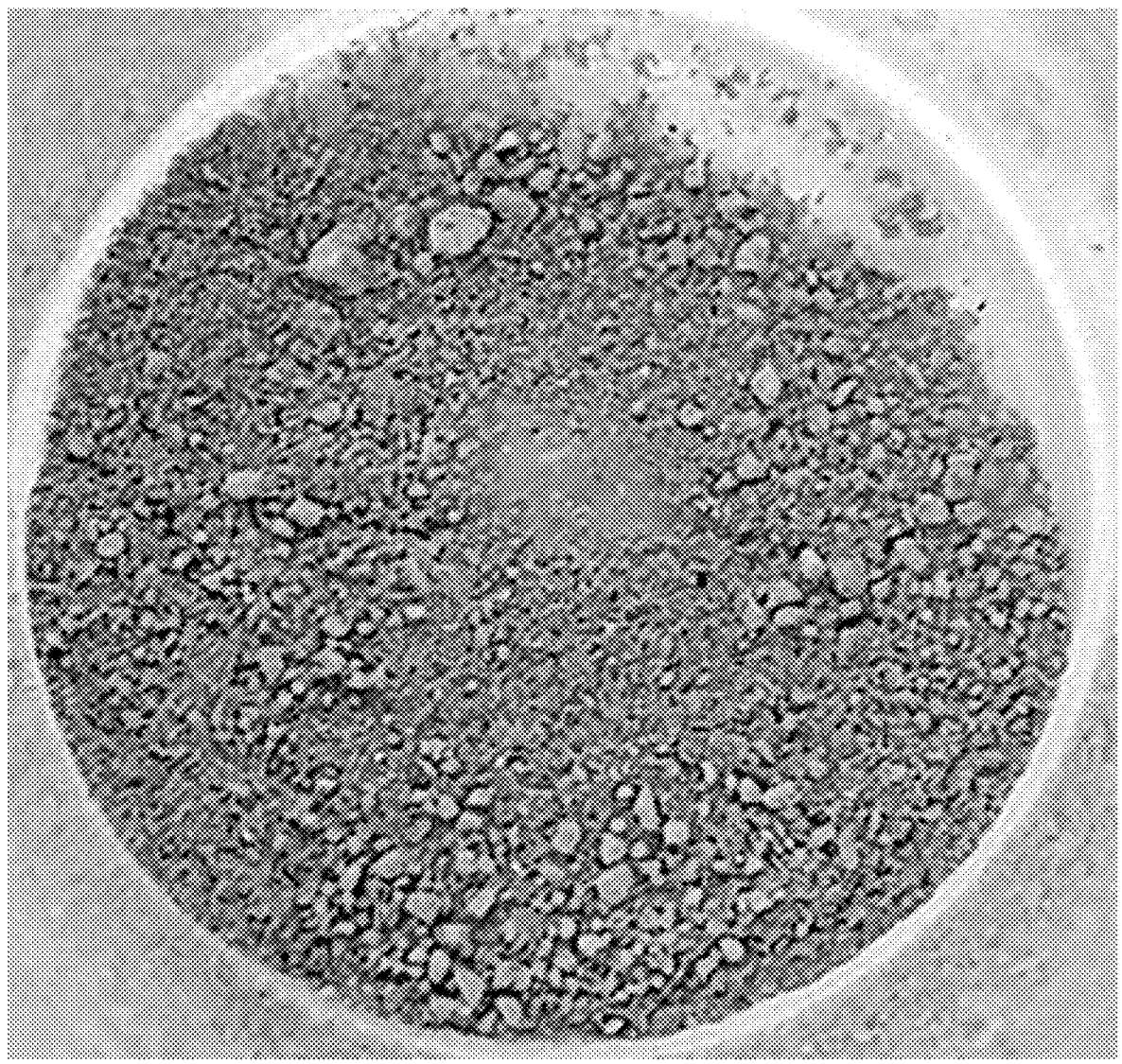
FIG. 7 is a photograph of a catalyst after a dry reforming reaction.

FIG. 7 shows an image of the catalyst after the dry reforming reaction of butane (n-$C_4H_{10}$+$4CO_2$→$8CO$+$5H_2$). Coking did not occur as observed by the lack of color change of the catalyst from gray to black due to carbon.

Figures 8A, 8B:
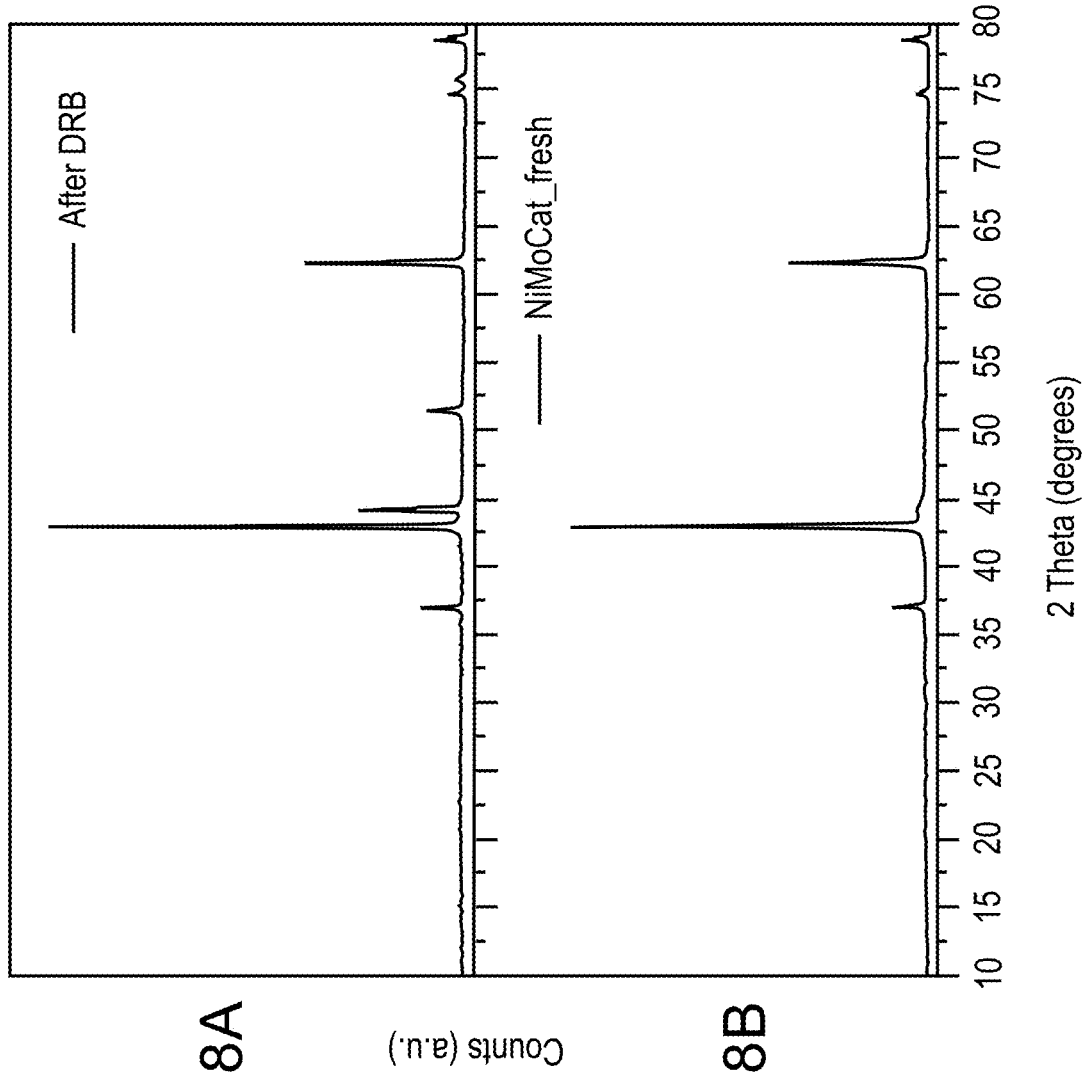
FIGS. 8a-b are graphs of X-ray diffraction (XRD) data.

FIG. 8b shows the X-ray diffraction (XRD) graph of the catalyst before the reaction and FIG. 8a shows the XRD graph of the catalyst after the DRB reaction. The XRD of the catalyst before the reaction (FIG. 8b) only shows peaks from MgO. After the DRB reaction (FIG. 8a), Ni particle peaks were present around 450 and 52°, suggesting that during the reaction, metal that was deposited on the MgO formed nanoparticle structures. Additionally, no coking was observed around 20-30°.

Figure 9:
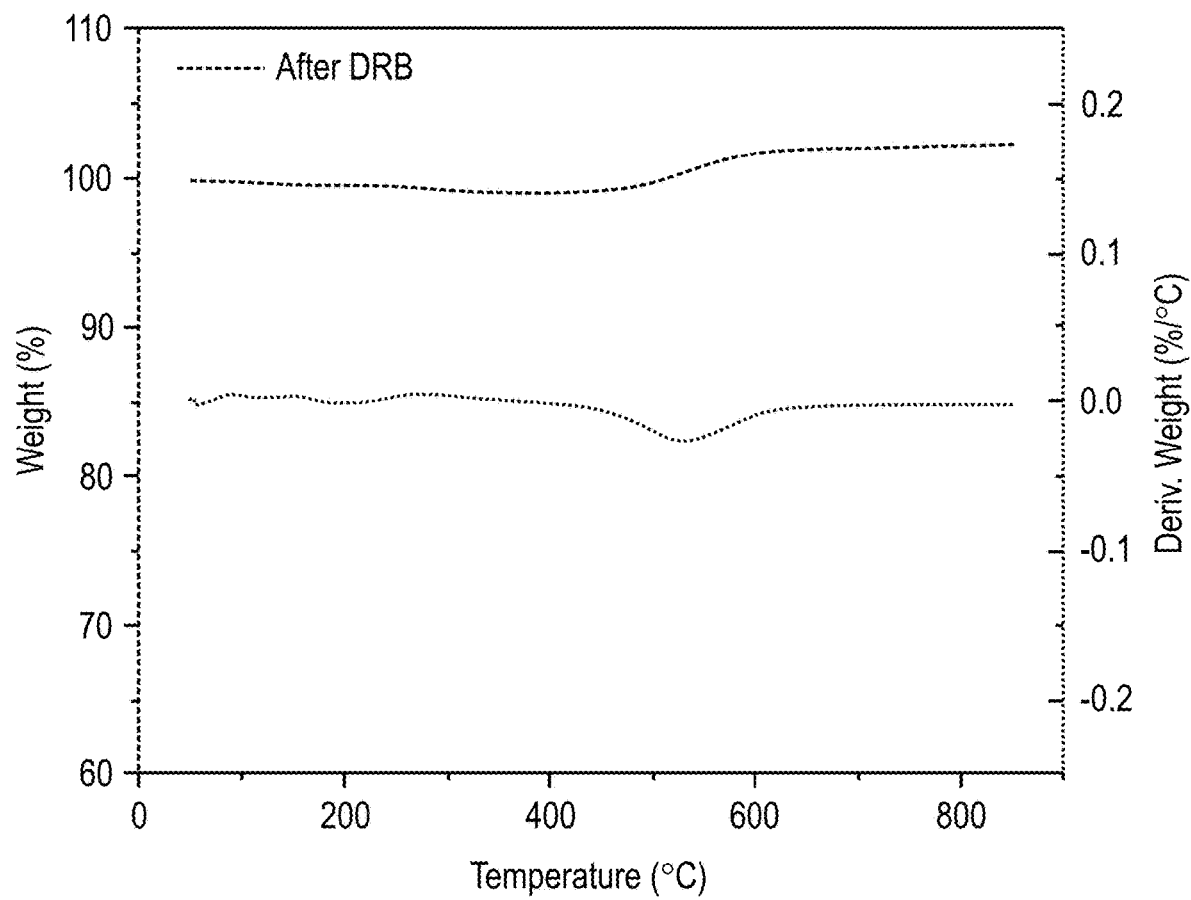
FIG. 9 is a graph of thermal gravimetric analysis (TGA) data.

FIG. 9 shows the thermal gravimetric analysis (TGA) of the catalyst after DRB performed with a ramping rate 10° C./min under 02. The TGA did not demonstrate any weight loss suggesting that no carbon structure was present.

100 mg of catalyst was loaded on a fixed bed Inconel reactor and the temperature was heated to 600° C. Then, the reagent gases were injected (total flow: 40 mL/min, He/$CO_2$/n-$C_4H_{10}$=35/4/1). After 12 hours, the reactor temperature was increased to 650° C., then 700° C., and then cooled down to 600° C. as shown in FIG. 10a. The reaction was terminated after a total reaction time of 70 hours and the dry reforming performance is presented in FIG. 10a.

Dry reforming of butane occurred at temperatures below 700° C.; however, coking occurred as can be observed from the black color of the catalyst after the reaction as shown in FIG. 10b. Coking may have occurred as carbon structures can grow at the temperature range used for the dry reforming reaction in FIG. 10a. Therefore, butane should be reformed at a temperature of at least 700° C. or greater.

Example 5—Dry Reforming of Butane as a Function of Carbon Dioxide Concentration

In the dry reforming of butane, the theoretical ratio of butane to carbon dioxide is 1:4. However, methane was observed during the dry reforming of butane. To reduce the amount of methane, the butane to carbon dioxide ratio was increased to 1:9.

100 mg of catalyst was loaded on fixed bed Inconel reactor and the reactor was heated to 800° C. Then, the reagent gases were injected (total flow: 40 mL/min, He/$CO_2$/n-$C_4H_{10}$=35/4/1). After 12 h, the flow gas ratio was changed to He/$CO_2$/n-$C_4H_{10}$=30/9/1 (total flow: 40 mL/min). After a total reaction time of 24 hours, the reaction was terminated.

Figure 11:
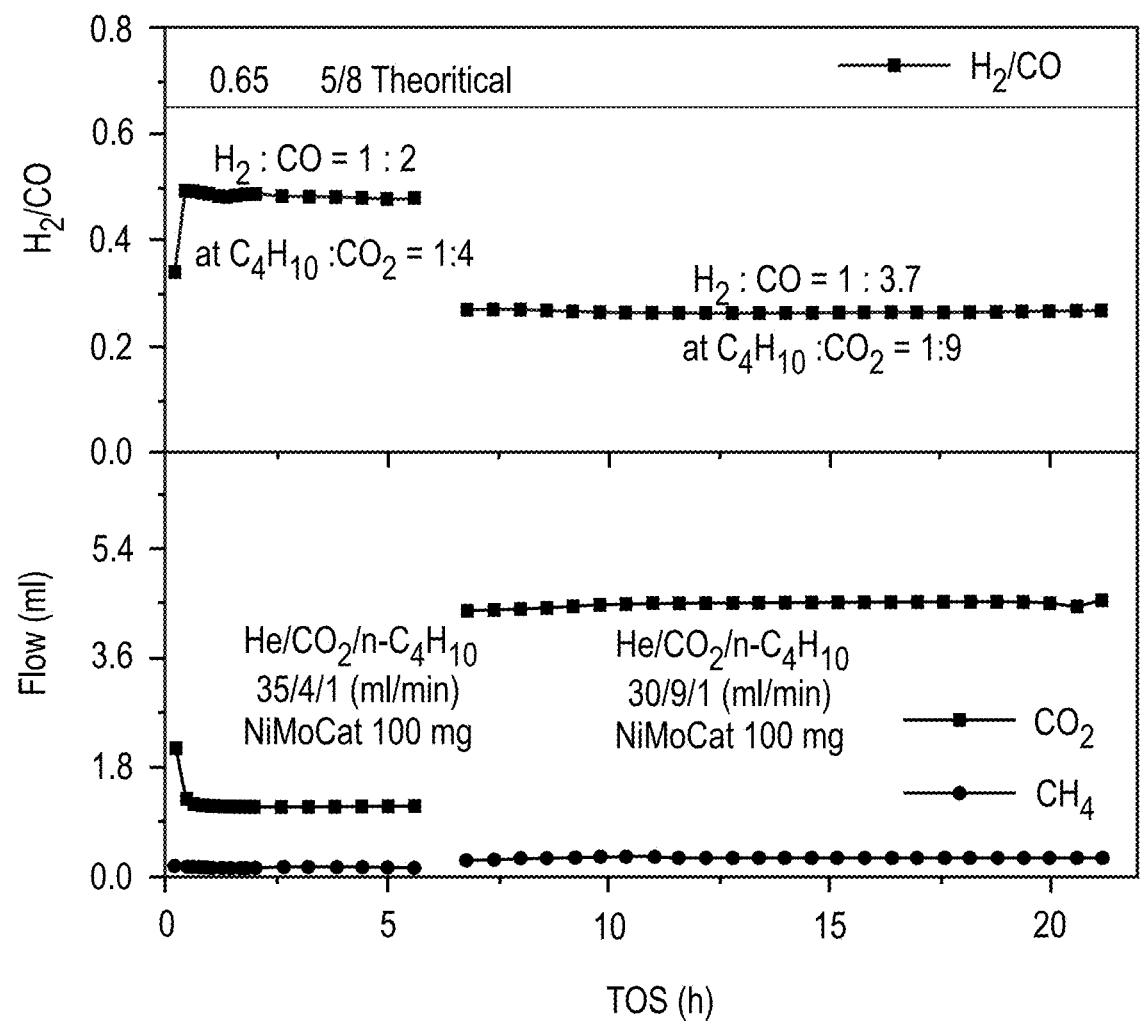
FIG. 11 shows experimental data of reactant conversions and product yields for a dry reforming reaction.

FIG. 11 shows the differences in dry reforming of butane based on the amount of carbon dioxide injected. Increasing the amount of carbon dioxide relative to butane caused an increase in the amount of methane and a decrease in the amount of hydrogen measured by the FID. The amount of methane produced was therefore affected by the amount of carbon dioxide used. A butane to carbon dioxide ratio of 1:4 may be preferable over a larger excess ratio such as 1:9.

Example 6—Catalyst Reactivation after Coking 100 mg of catalyst was loaded on fixed bed Inconel reactor and the reagent gases were injected (total flow: 40 mL/min, He/CO$_2$/n-C$_4$H$_{10}$=35/4/1). Before the reactor temperature reached 800° C., the dry reforming of butane (DRB) proceeded for about 1 hour. Then, after a total reaction time of 6 hours, the reaction was terminated.

Figure 12:
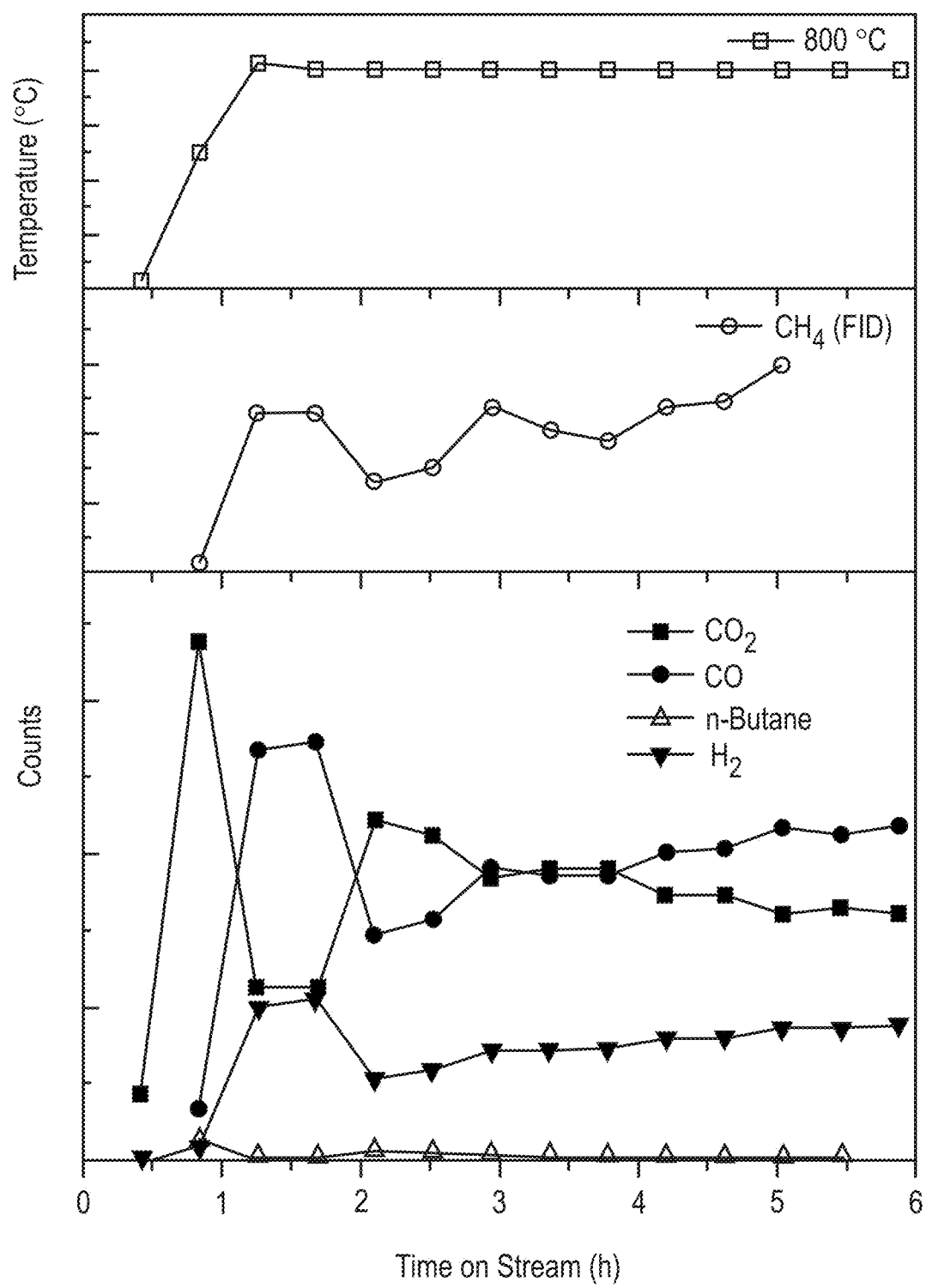
FIG. 12 shows experimental data of reactant conversions and product yields for a dry reforming reaction.

FIG. 12 shows the high temperature was successfully able to reactivate the catalyst as demonstrated by the consumption of butane and the generation of the dry reforming products carbon monoxide and hydrogen gas.

Figure 13:
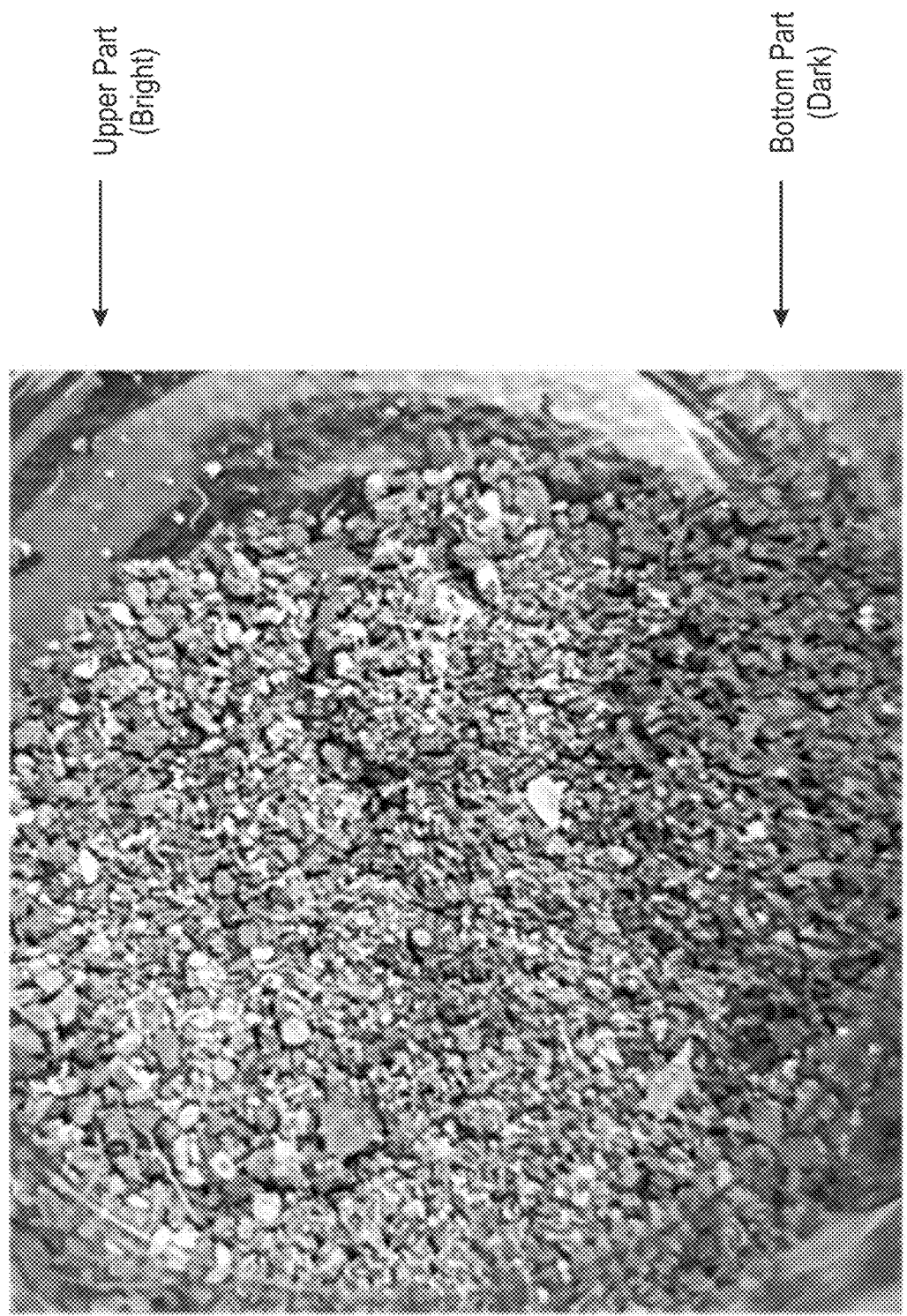
FIG. 13 is a photograph of a catalyst that has been reactivated after coke formation.

FIG. 13 shows a photograph of the catalyst removed from the catalytic reactor after reactivation. Coking was removed from the top portion of the catalyst, as demonstrated by the bright color, whereas coking was still left on the darker bottom portion. This provides further evidence that the catalyst can be reactivated after coking.

Figure 14:
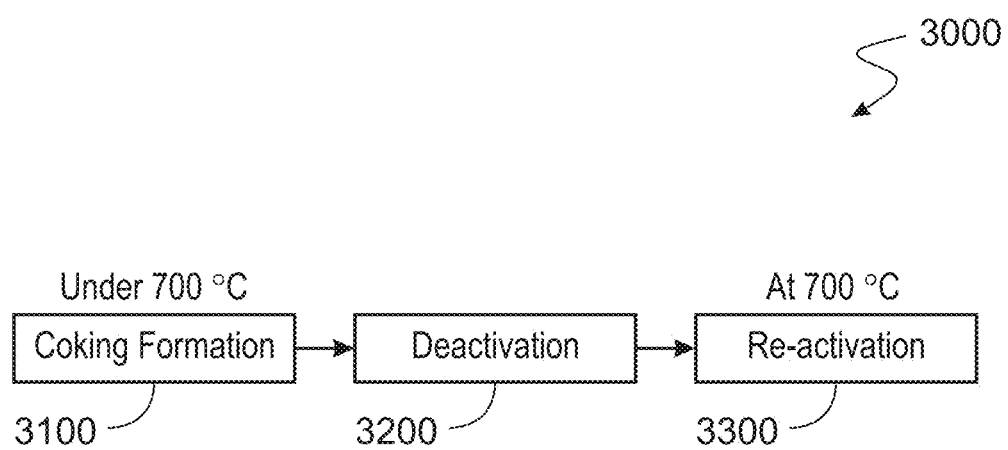
FIG. 14 is a flow chart of a method of reactivation of a catalyst after coke formation.

FIG. 14 shows a flow chart 3000 for the catalyst reactivation process. In step 3100, coking may occur due to conducting dry reforming at a temperature below 700° C. Coking leads to deactivation of the catalyst 3200. In step 3300, the catalyst can be reactivated under dry reforming reaction conditions at a temperature of 700° C.

Figure 15A:
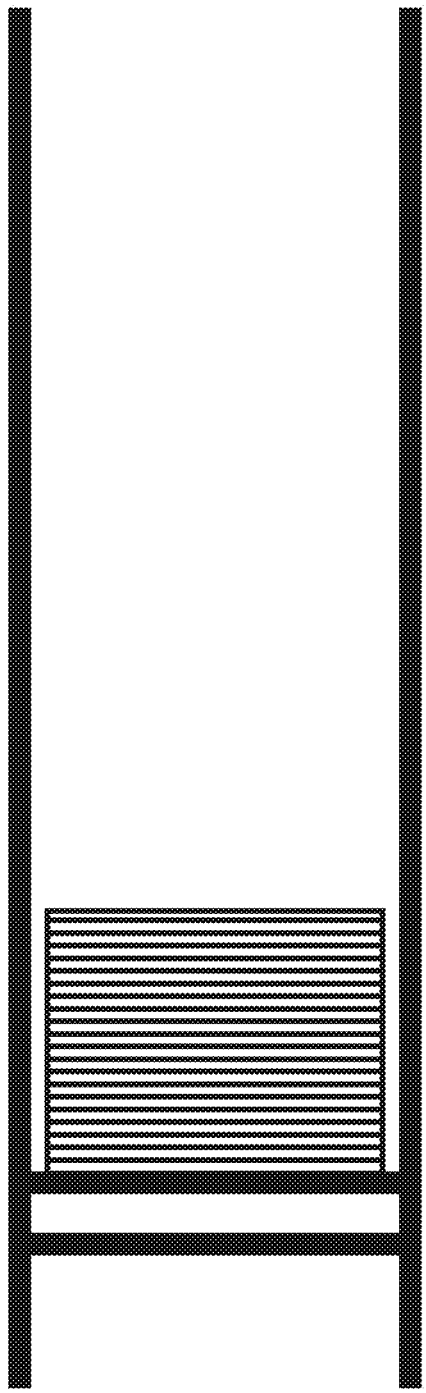
FIGS. 15a-b schematically depict reactivation of a catalyst after coke formation.
Figure 15B:
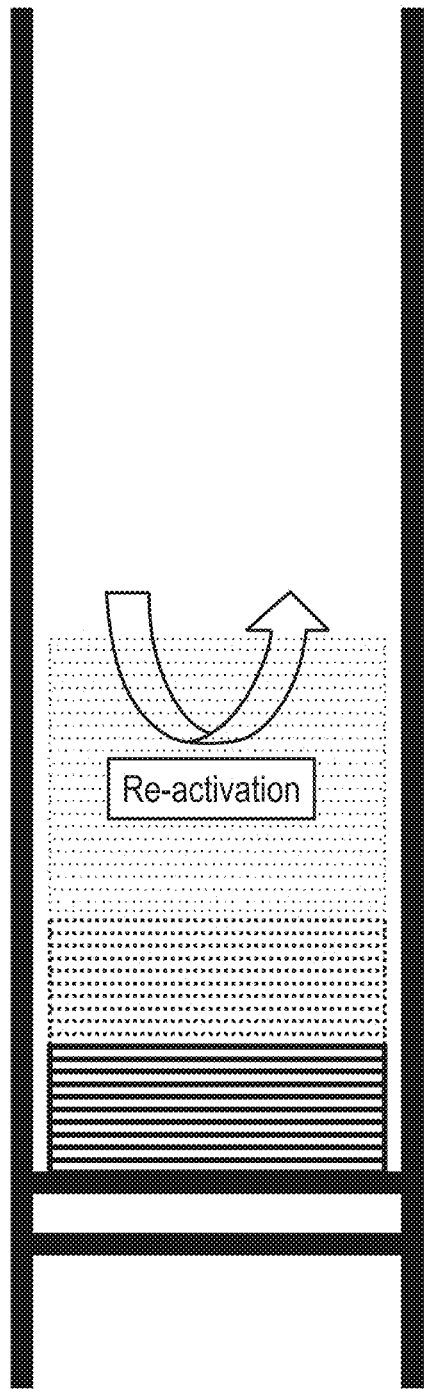

FIGS. 15a-b schematically depicts the reactivation process. The catalyst in FIG. 15a has undergone coking. In FIG. 15b, portions of the catalyst with coking exposed to the dry reforming reactant mixture at a temperature of 700° C. or greater will be reactivated as evidenced by a change in color of the catalyst to a brighter color (original color of the catalyst).

Example 7—Catalyst Component Analysis

Figure 16:
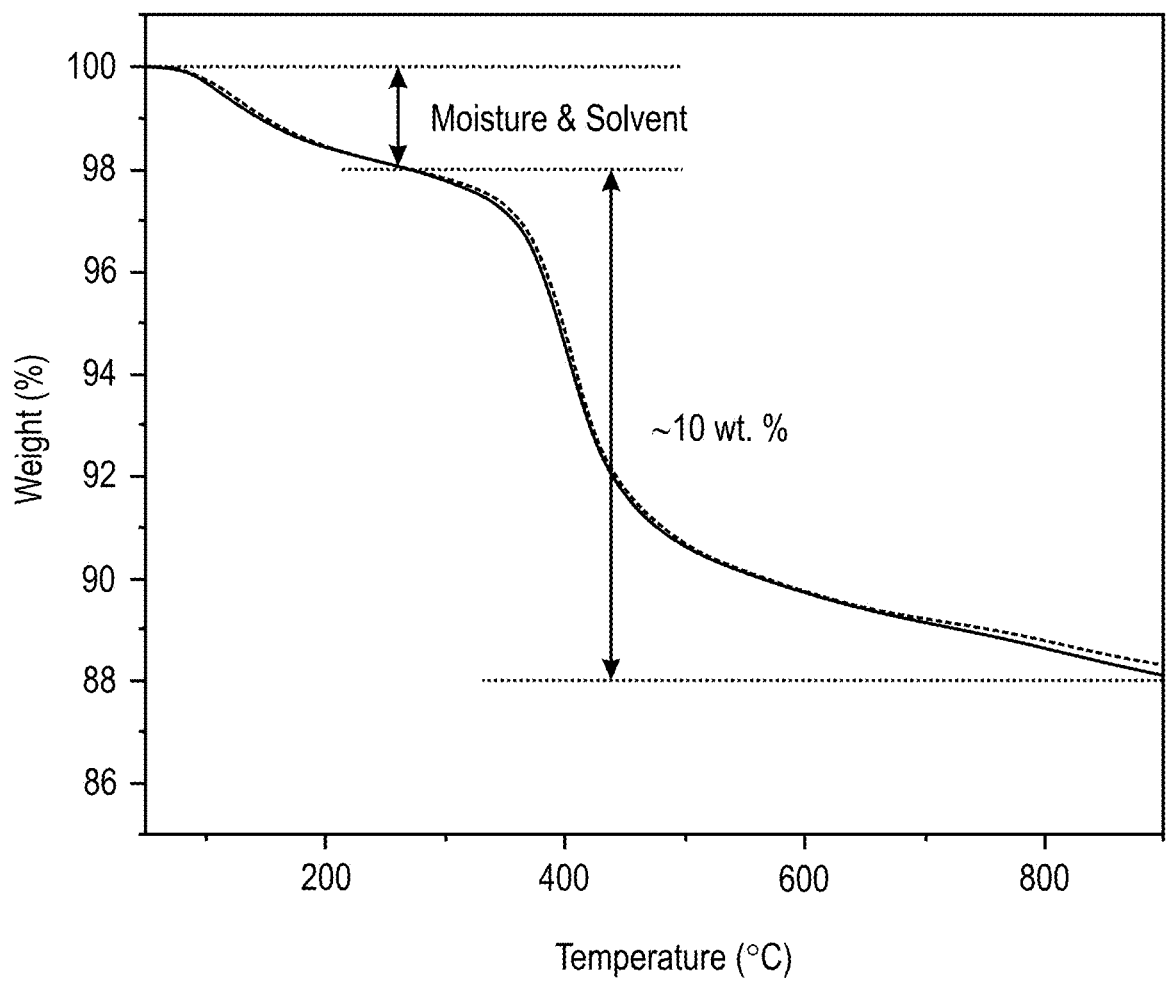
FIG. 16 is a graph of thermal gravimetric analysis (TGA) data.

FIG. 16 shows the thermal gravimetric analysis (TGA) of the catalyst under N$_2$ flow and a heating rate of 10° C./min. The initial weight loss of the catalyst was 2% up to 250° C. due to the elimination of the moisture and hydroxide groups from MgO. The second weight loss from 370 to 800° C. resulted from the elimination of chemically adsorbed H$_2$O on the MgO surfaces.

Figures 17A, 17B:
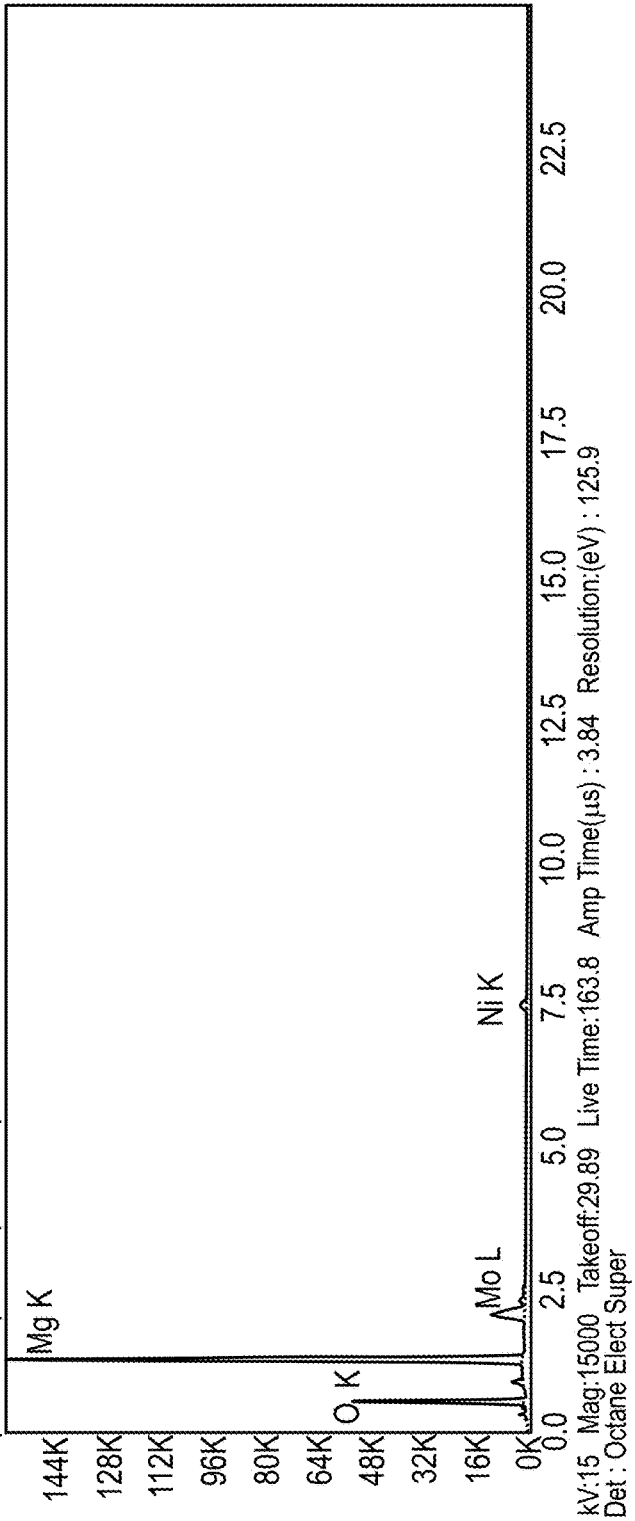
FIG. 17a is a graph of Energy Dispersive Spectroscopy (EDAX) data.
FIG. 17b is a table of Energy Dispersive Spectroscopy (EDAX) data.

FIGS. 17a and 17b show Energy Dispersive Spectroscopy (EDAX) analysis of the catalysts. No carbon peak was observed. This result suggests that the catalysts made by the synthetic procedure of Example 1 can be used for C$_1$-C$_4$ hydrocarbon reforming and be prepared on an industrial scale by as the amount of organic residue on the catalyst surface is reduced relative to other catalysts and methods of making catalysts.

Tables 2 and 3 present the results from an inductively coupled plasma atomic emission spectroscopy (ICP-OES) analysis. From the ICP-OES results, the molar ratio of Ni:Mo was found to be 8.8:1 and the NiMo:MgO weight ratio was 1:7.5.

TABLE 1

Ni and Mo molar ratio in the catalyst from ICP-OES analysis.

|  | Ni | Mo |
|---|---|---|
| Molar ratio | 8.8 | 1 |

TABLE 2

Ni, Mo, and MgO weight ratio in the catalyst

|  | Ni | Mo | MgO |
|---|---|---|---|
| Weight ratio (%) | 9.92 | 1.84 | 88.24 |

Figure 18:
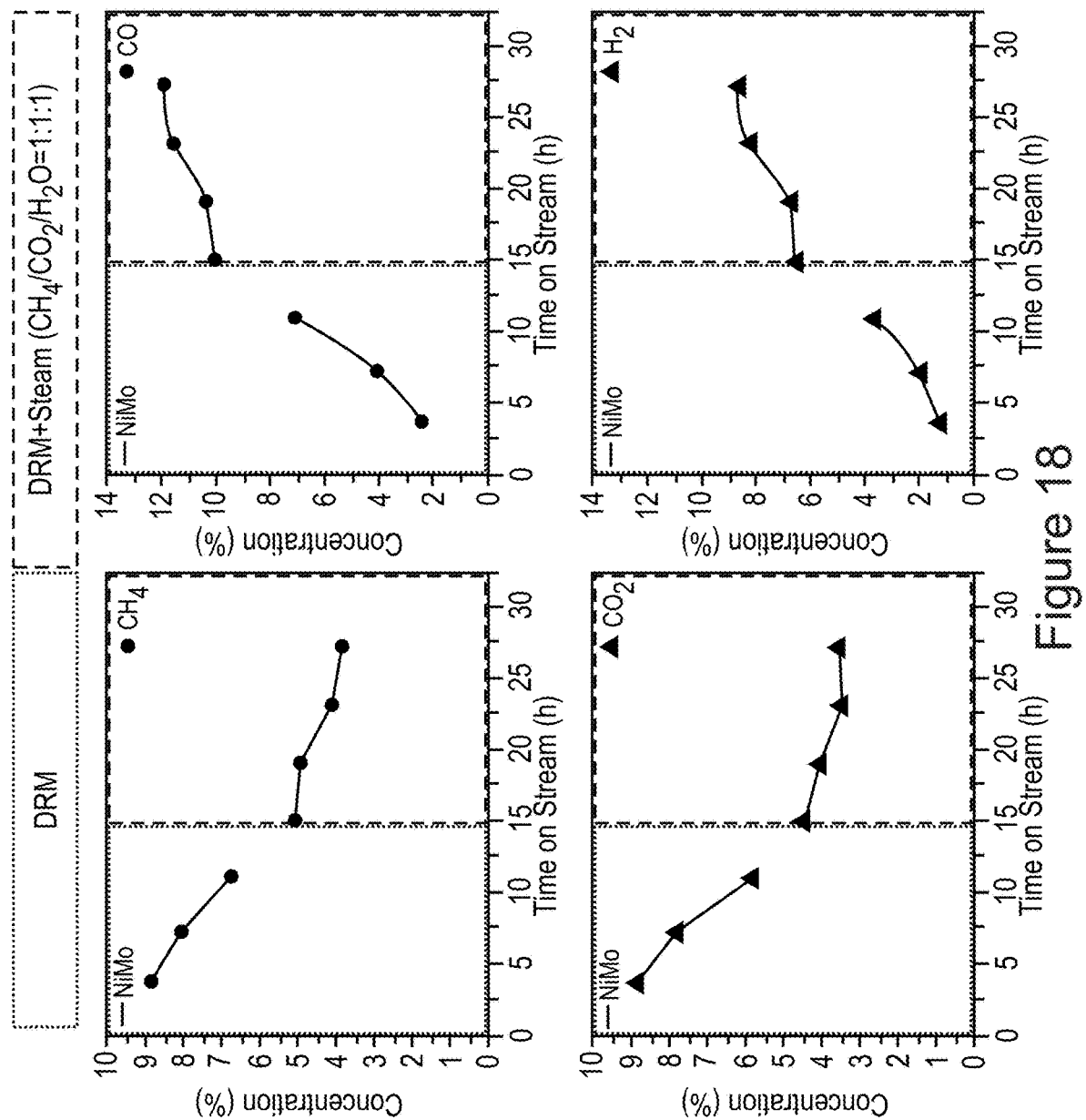
FIG. 18 shows experimental data of reactant conversions and product yields for a dry reforming reaction in the absence and presence of steam.

Example 8—Dry Reforming of Methane with Steam 10 mg of catalyst was loaded on fixed bed SUS reactor (i.d. 2 mm) and the reagent gases were injected (total flow: 15 mL/min, He/CO$_2$/CH$_4$=12/1.5/1.5). The reactor pressure was increased to 15 bar, and the temperature was increased to 800° C. The GC detected four gases (H$_2$, CO, CO$_2$, CH$_4$) and the dry reforming of methane (DRM) proceeded for about 15 hours. After the DRM reaction, steam was directly injected with the same flow of reagent gases (total flow: 15 mL/min, He/CO$_2$/CH$_4$/steam=10.5/1.5/1.5/1.5). After 15 hours of reaction, the run was terminated. The concentrations of the four gases detected (H$_2$, CO, CO$_2$, CH$_4$) are shown in FIG. 18.

After the addition of steam, total conversion was high and the concentration of H$_2$ increased (H$_2$/CO changed from $0.55_{DRM}$ to $0.78_{with\ steam}$). Notably, there was no coking observed after the reaction. It has been demonstrated that the ratio of hydrogen and carbon monoxide can be independently adjusted and DRM can be carried out without coking even in the presence of steam.

OTHER EMBODIMENTS

While certain embodiments have been disclosed above, the disclosure is not limited to such embodiments.

As an example, while embodiments have been disclosed that include using the catalysts in a dry reforming reaction, the disclosure is not limited to such embodiments. In some embodiments, the catalysts can be used in a wet reforming (steam reforming) reaction (e.g., steam reforming of methane, steam reforming of hydrocarbons), flue gas reforming, plastic reforming with carbon dioxide, and hydrogen sulfide removal reaction.

As another example, embodiments have been disclosed that include catalysts containing nickel and molybdenum, the disclosure is not limited to such embodiments. In some embodiments, the catalysts can contain various combinations of two or more of nickel (Ni), molybdenum (Mo), cobalt (Co), ruthenium (Ru), palladium (Pd), iridium (Ir), platinum (Pt) and/or rhodium (Rh).

As a further example, while embodiments have been described in which an organic residue present in the catalyst dissolves in the second solvent and remains in the top layer, the disclosure is not limited to such embodiments. In certain embodiments, the methods of the disclosure can be used to remove ions (e.g., anion such as Cl$^-$, cations such as NH$^{4+}$, and/or unbound metal ions.

What is claimed:
1. A method, comprising:
   a) combining a nickel precursor, a molybdenum precursor and a metal oxide in a first solvent to provide a mixture;
   b) adding a second solvent to the mixture to precipitate a catalyst from the mixture, wherein the precipitated catalyst forms a first layer and the first solvent and the second solvent form a second layer; and c) removing the second layer, wherein the catalyst comprises nickel, molybdenum and the metal oxide; and wherein the second solvent comprises a member selected from the group consisting of acetone, toluene, ethanol, ethyl acetate, propanol, butanol, methanol, dichloromethane, and acetonitrile.

2. The method of claim 1, further comprising repeating b) and c) at least three times.

3. The method of claim 1, wherein the second solvent comprises ethanol.

4. The method of claim 1, further comprising, after c), isolating the catalyst from the first solvent; and drying the isolated catalyst.

5. The method of claim 1, wherein:

the nickel precursor comprises a member selected from the group consisting of $NiCl_2$, $NiCl_2 \cdot 6H_2O$, $Ni(NO_3)_2$, $NiSO_4$, $Ni(NH_4)_2$, $Ni(SO_4)_2 \cdot 6H_2O$, $Ni(OCOCH_3)_2 \cdot 4H_2O$, $NiBr_2$, $NiCO_3$, $NiF_2$, $NiI_2$, $NiC_2O_4 \cdot 2H_2O$ and $Ni(ClO_4)_2 \cdot 6H_2O$; and the molybdenum precursor comprises a member selected from the group consisting of $Mo(CO)_6$, $MoO_3$, $Na_2MoO_4$, $CaMoO_4$, $ZnMoO_4$ and $(NH_4)_6Mo_7O_2 \cdot 4H_2O$.

6. The method of claim 5, wherein the metal oxide comprises a member selected from the group consisting of $ZrO_2$, $MgO$, $TiO_2$, $Al_2O_3$, $SiO_2$, $CrO_2$, $Fe_2O_3$, $Fe_3O_4$, $CuO$, $ZnO$, $CaO$, $Sb_2O_4$, $Co_3O_4$, $Fe_3O_4$, $Pb_3O_4$, $Mn_3O_4$, $Ag_2O_2$, $U_3O_8$, $Cu_2O$, $Li_2O$, $Rb_2O$, $Ag_2O$, $Tl_2O$, $BeO$, $CdO$, $TiO$, $GeO_2$, $HfO_2$, $PbO_2$, $MnO_2$, $TeO_2$, $SnO_2$, $La_2O_3$, $Fe_2O_3$, $CeO_2$, $WO_2$, $UO_2$, $ThO_2$, $TeO2$, $MoO_2$, and $MoO_3$.

7. The method of claim 1, wherein the metal oxide comprises $MgO$.

8. The method of claim 1, wherein the first solvent comprises water and ethylene glycol.

9. The method of claim 1, wherein a) further comprises including a reducing agent in the mixture.

10. The method of claim 1, wherein a) further comprises including a surfactant to the mixture.

11. The method of claim 1, wherein the nickel precursor comprises $NiCl_2$ $6H_2O$, the molybdenum precursor comprises $(NH_4)_6Mo_7O_2$ $4H_2O$, and the metal oxide comprises $MgO$.

12. The method of claim 1, wherein a weight ratio of nickel from the nickel precursor to metal oxide in the mixture is 0.01 wt. % to 40 wt. %.

13. The method of claim 1, wherein a weight ratio of molybdenum from the molybdenum precursor to the metal oxide in the mixture is from 0.01 wt. % to 39.9 wt. %.

14. The method of claim 1, further comprising, after c), using the catalyst in a dry reforming reaction.

15. The method of claim 14, wherein the dry reforming reaction comprises reacting carbon dioxide and a $C_1$-$C_4$ hydrocarbon to make carbon monoxide and hydrogen.

16. The method of claim 14, further comprising, after using the catalyst in a dry reforming reaction, removing coke from the catalyst.

* * * * *